(12) United States Patent
Sobukawa et al.

(10) Patent No.: US 6,492,298 B1
(45) Date of Patent: Dec. 10, 2002

(54) ORDINARY-TEMPERATURE PURIFYING CATALYST

(75) Inventors: Hideo Sobukawa, Aichi (JP); Toshitaka Tanabe, Aichi (JP); Kenichirou Suzuki, Aichi (JP); Megumi Sasaki, Aichi (JP); Hiroaki Hayashi, Aichi (JP); Akira Morikawa, Aichi (JP); Masahiro Sugiura, Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 09/538,375

(22) Filed: Mar. 29, 2000

(30) Foreign Application Priority Data

Mar. 29, 1999 (JP) .............................. 11-086887
Oct. 18, 1999 (JP) .............................. 11-295554

(51) Int. Cl.$^7$ ........................... B01J 23/00; B01J 23/40; B01J 23/56; B01J 23/44; B01J 23/42
(52) U.S. Cl. ................. 502/325; 502/326; 502/327; 502/332; 502/333; 502/334; 502/336; 502/337; 502/338; 502/339; 502/66; 502/74; 423/213.5; 423/239.1; 423/245.1; 423/247
(58) Field of Search ............................ 502/325, 326, 502/327, 331, 332, 333, 334, 335, 336, 337, 338, 339, 304, 308, 309, 313, 314, 315, 316, 318, 319, 320; 423/213.5, 239.1, 247, 245.1

(56) References Cited

U.S. PATENT DOCUMENTS

| | | | | |
|---|---|---|---|---|
| 3,901,828 A | * | 8/1975 | Mai et al. ..................... 252/462 |
| 4,294,726 A | | 10/1981 | Bozon et al. | |
| 4,299,734 A | * | 11/1981 | Fujitani et al. ............. 252/462 |
| 4,450,244 A | * | 5/1984 | Domesle et al. ............. 502/185 |
| 4,843,056 A | * | 6/1989 | Matsumoto et al. ........ 502/302 |
| 4,927,799 A | * | 5/1990 | Matsumoto et al. ........ 502/303 |
| 5,015,617 A | * | 5/1991 | Ohata et al. ................. 502/304 |
| 5,017,357 A | | 5/1991 | Kolts et al. | |
| 5,075,276 A | * | 12/1991 | Ozawa et al. ............... 502/304 |
| 5,308,457 A | * | 5/1994 | Dalla Betta et al. ........ 204/131 |
| 5,480,854 A | | 1/1996 | Rajaram et al. | |
| 5,585,083 A | | 12/1996 | Kielin et al. | |

(List continued on next page.)

FOREIGN PATENT DOCUMENTS

| | | |
|---|---|---|
| EP | 0 393 612 A2 | 10/1990 |
| EP | 0 715 879 A1 | 6/1996 |
| EP | 0 834 348 A2 | 4/1998 |
| GB | 1116585 | 6/1968 |
| GB | 2 234 450 A | 2/1991 |
| JP | 6-219721 | 8/1994 |
| JP | 7-51567 | 2/1995 |
| JP | 10-296087 | 11/1998 |
| JP | 11-086887 | 3/1999 |
| JP | 11-295554 | 10/1999 |
| JP | 2000-086551 | 3/2000 |
| WO | WO 91/01175 | 2/1991 |

*Primary Examiner*—Stanley S. Silverman
*Assistant Examiner*—Cam N. Nguyen
(74) *Attorney, Agent, or Firm*—Oblon, Spivak, McClelland, Maier & Neustadt, P.C.

(57) ABSTRACT

An ordinary-temperature purifying catalyst includes an oxide having an oxygen defect introduced by a reduction treatment, and a noble metal loaded on the oxide. For example, the oxide can be at least one oxide selected from the group consisting of cerium oxides and zirconium oxides, at least a part of which has an oxygen defect. The catalyst can purify an environmental loading material, such as carbon monoxide, a nitrogen oxide, ethylene, formaldehyde, trimethylamine, methyl mercaptan and acetaldehyde, in air at an ordinary temperature. A method for how to use the catalyst is also disclosed.

27 Claims, 8 Drawing Sheets

U.S. PATENT DOCUMENTS

| | | | | |
|---|---|---|---|---|
| 5,898,014 A | * | 4/1999 | Wu et al. | 502/302 |
| 5,945,369 A | * | 8/1999 | Kimura et al. | 502/304 |
| 5,948,723 A | * | 9/1999 | Sung | 502/303 |
| 6,051,529 A | * | 4/2000 | Brezny | 502/302 |
| 6,107,240 A | * | 8/2000 | Wu et al. | 502/304 |
| 6,139,814 A | * | 10/2000 | Shigapov et al. | 423/592 |
| 6,150,288 A | * | 11/2000 | Suzuki et al. | 501/105 |
| 6,150,299 A | * | 11/2000 | Umemoto et al. | 502/304 |

* cited by examiner

ORDINARY-TEMPERATURE PURIFYING CATALYST

BACKGROUND OF THE INVENTION

1. Field of the Invention

The present invention relates to an ordinary-temperature purifying catalyst, which can purify and remove an environmental loading material, such as carbon monoxide (CO), odorants, nitrogen oxides ($NO_x$) and hydrocarbons (IC), formaldehyde which often generates in houses, and an ethylene gas which causes to deteriorate the freshness of foods, at an ordinary temperature (e.g., room temperature).

2. Description of the Related Art

Conventionally, in order to remove odorants and harmful gases, adsorbents, such as activated carbon and zeolite, have been used so far. However, the adsorbents require means for processing the adsorbed components.

Further, in order to purify carbon monoxide, one of harmful gases, the performance is required which purifies and removes carbon monoxide in a lower temperature range and in a shorter period of time. However, conventional catalysts have been still insufficient in the purifying ability at an ordinary temperature. Accordingly, a further improvement is required in the purifying performance.

The influences of formaldehyde to human bodies are irritating actions to the eyes, nose and throat. For example, the influences accompany syndromes, such as discomfort feelings, tearing, sneezing, coughing, vomiting and difficult breathing. The sources of the generation in the housing spaces are believed to be cigarette smoking, usages of heating apparatuses, home appliances, pieces of furniture and building materials. The formaldehyde is used as urea-formaldehyde adhesives in a large amount, is a raw material for adhesives for plywoods and particle boards, and is used as antiseptics for adhesives for wall papers. Accordingly, the Japanese Health and Welfare Ministry presents that the reference value of the formaldehyde concentration be 0.1 mg/Nm 3 (=80 ppb) or less in a room.

Recently, the formaldehyde has been regarded as one of the materials which cause the sick-house syndromes. Accordingly, the material makers and the housing makers try to construct houses with materials, which do not generate the formaldehyde, and to age houses so as to reduce the formaldehyde concentration before they hand over the houses to the customers. However, it cannot be said that the aforementioned treatments necessarily satisfy the reference values of the Japanese Health and Welfare Ministry.

Whilst, in order to remove the volatile formaldehyde, adsorbents, such as activated carbon and zeolite, have been used. However, the adsorbents have limited longevity. Accordingly, it is necessary to regularly replace the adsorbents, and to spend economical expenses. Further, it is necessary to provide means for processing the components adsorbed on the adsorbents anew.

As means for removing thee indoor odorants, etc., at an ordinary temperature, air purifiers have been known generally into which activated carbon is incorporated. Further, air purifiers have been commercially available which utilize photocatalysts.

In addition, the following have been put in markets: namely; methods for removing the odorants, etc., with ozone; methods by using photocatalysts therefor; apparatuses therefor; and filters therefor. However, regarding ozone, it is necessary to exceed the regulatory value of the ozone concentration in order to exhibit the advantages. Further, it is necessary to provide a catalyst for removing the ozone. Concerning the photocatalytic system, it is necessary to provide an artificial light source which excites the photocatalysts. Further, it is necessary to spend expenses for electricity when the light source always irradiates the photocatalysts. Hence, the costs go up.

In Japanese Unexamined Patent Publication (KOKAI) No. 6-219,721, a catalyst is disclosed. The catalyst includes metallic oxide particles, in which noble metal particles are mixed uniformly, and which are composed of $CeO_2$. The metallic oxide can be at least one member selected from the group consisting of $CeO_2$, $ZrO_2$, $TiO_2$ and $SnO_2$ This catalyst is made by coprecipitating the metallic oxide, which is composed of the noble metal particles for purifying carbon monoxide to carbon dioxide. The catalyst has anionic holes in the surface so that it exhibits a high reactivity without a hydrogen reduction treatment. However, the publication discloses that the purifying performance was evaluated under the temperature condition of 150° C. or more, and does not refer to the purifying activity in a room temperature range.

Whilst, a specific catalyst is proposed as a method for oxidizing and decomposing odorants or harmful gases in air. For instance, Japanese Unexamined Patent Publication (KOKAI) No. 10-296,087 discloses that a catalyst,, which requires zirconia or ceria as an indispensable component and at least one member selected from the group consisting of Ag, Pd, Pt, Mn and Rh is loaded thereon, can be used to oxidize and decompose trimethylamine. However, in this case as well, the disclosed catalyst was simply examined for the purifying activity under the temperature condition of 200° C. in the examples. Further, the publication does not set forth the oxygen defect of the oxide used in the catalyst. Therefore, it is not believed that the catalyst keeps a sufficient ability of decomposing trimethylamine at a room temperature.

In a publication of the PCT applications, e.g., No. WO-91/01,175, a catalyst is disclosed which oxidizes oxydants in a low temperature range. The catalyst includes at least one reducing metallic oxide selected from the group consisting of iron oxide, ceria, zirconia, copper oxide, rare-earth element oxide, manganese oxide, vanadium oxide and chromium oxide, and a noble metal loaded on the metallic oxide. According to the publication, the catalyst oxidizes oxydants whose molecular weight is 50 or less at a temperature of up to 30° C. When paying attention to the reduction temperature as one of the production conditions of this catalyst, the publication sets forth that the reduction treatment was carried out at room temperature. However, it is impossible to introduce an oxygen defect, which exhibits a function of the present invention, into the aforementioned metallic oxides at room temperature.

In Japanese Unexamined Patent Publication (KOKAI) No. 7-51,567, a catalyst is disclosed. The catalyst is made by suspending activated carbon in an aqueous solution, in which molybdenum or cerium and platinum are solved, and by loading the molybdenum or cerium and the platinum on the activated carbon with heat or a reducing agent. However, the publication does not refer to subjecting the catalyst to a certain treatment after the loading.

Generally speaking, air cleaner filters using activated carbon effect the deodoring ability by physically adsorbing the odorants on the activated carbon. However, the activated carbon exhibits an upper limit of the adsorption, and does not effect the deodoring performance more than the saturated adsorption. Accordingly, the filters have short lives. Hence, it is essential to regenerate the filters for a long period of usage. When the regenerating is not carried out, it is indispensable to replace the filters.

In the filters using photocatalysts, it is indispensable to irradiate a light to actuate the photocatalysts in order to purify harmful substances. In order to carry out this, it is necessary to use a light source, such as a mercury lamp. Therefore, there arises a drawback in that the air cleaners, which employ the filters using the photocatalysts, are remarkably expensive in terms of the equipment costs and the running costs.

An ethylene gas contained in air is believed to degrade the freshness of fruit and vegetables by facilitating the physiological actions of fruit and vegetables and by developing the additional aging thereof. Accordingly, in order to preserve the freshness of perishables, the following methods are proposed: namely; decomposing the ethylene with ozone or hydrogen peroxide; and adsorbing the ethylene.

However, in the aforementioned methods, the adsorbing method exhibits the shortened duration of the good effects. Accordingly, when the ozone decomposition or the photocatalyst is used together with the adsorbing method in order to compensate for the disadvantage, there arises a problem in that an apparatus taking part in the removing means is large-sized so that it is too costly or it requires a large equipment space. Thus, the adsorbing method has a drawback in terms of the practical application.

SUMMARY OF THE INVENTION

The present invention has been developed in view of the aforementioned circumstances. It is therefore an object of the present invention to provide an ordinary-temperature catalyst which can decompose or purify the environmental loading material, such as formaldehyde and ethylene, contained in air at an ordinary temperature, and which is less likely to degrade chronologically. The "ordinary temperature" hereinafter means a temperature range including a room temperature which does not require special heating and cooling or less.

An ordinary-temperature purifying catalyst according to the present invention comprises: an oxide having an oxygen defect introduced by a reduction treatment; and a noble metal loaded on the oxide. By loading the noble metal on the oxide having an oxygen defect, the present catalyst has an ability of purifying an environmental loading material in air at an ordinary temperature. As for the environmental loading material, it is possible to list odorants, carbon monoxide, hydrocarbons, such as ethylene, and nitrogen oxides.

The oxide constituting the present ordinary-temperature purifying catalyst can preferably be at least one oxide selected from the group consisting of an oxide of transition metal elements and an oxide of rare-earth elements. As for the oxide of transition metal elements, it is possible to use at least one oxide selected from the group consisting of oxides of zirconium, iron, manganese, cobalt, nickel, copper, chromium, molybdenum and niobium. As for the oxide of rare-earth elements, it is possible to use at least one oxide selected from the group consisting of oxides of cerium, yttrium, neodymium, praseodymium and samarium.

The oxide constituting the present ordinary-temperature purifying catalyst can be composed of a cerium oxide, and at least a part of the cerium oxide can have an oxygen defect by a reduction treatment. The cerium oxide can preferably be represented by a formula of $CeO_n$ wherein $1.5 \leq n < 2$. The cerium oxide can further preferably be represented by a formula of $CeO_n$ wherein $1.5 \leq n \leq 1.8$. The present catalyst including the cerium oxide is capable of purifying at least one member selected from the group consisting of aldehyde, amine, mercaptan, fatty acids, aromatic hydrocarbon, and odorants.

In the present ordinary-temperature purifying catalyst, the oxide can preferably include a cerium oxide and a zirconium oxide, at least a part of the cerium oxide having the oxygen defect. Further, the cerium oxide and the zirconium oxide can preferably form a solid solution, a composite oxide, or a mixture thereof.

The oxide can preferably have a specific surface area of 50 $m^2/g$ or more by being subjected to a reduction treatment at 500° C. for 1 hour. Under different conditions, the oxide can preferably have a specific surface area of 15 $m^2/g$ or more by being subjected to a reduction treatment at 800° C. for 1 hour.

The temperature of the reduction treatment can preferably fall in a range of from 100 to 800° C., further preferably in a range of from 200 to 600° C.

The present ordinary-temperature purifying catalyst can be loaded on at least one support selected from the group consisting of titanium oxide, alumina, silica, zeolite, cordierite, sepiolite and activated carbon.

After a purifying reaction of the odorant is carried out at 25° C. at a space velocity of 600,000 $hr^{-1}$, the present ordinary-temperature purifying catalyst can have a conversion ratio of 50% or more at 20 minutes after starting the purifying reaction. Further, the present ordinary-temperature purifying catalyst can have a conversion ratio of 40% or more at 30 minutes after the initiation of the purifying reaction provided that the carbon monoxide is supplied at 25° C. at a space velocity of 120,000 $hr^{-1}$.

A method for using an ordinary-temperature purifying catalyst according to the present invention comprises a step of contacting the above-described ordinary-temperature purifying catalyst with air including at least one environmental loading material selected from the group consisting of carbon monoxide, a nitrogen oxide, ethylene, aldehyde, amine, mercaptan, fatty acids, aromatic hydrocarbon, and odorants, thereby purifying the environmental loading material at an ordinary temperature.

Since the present ordinary-temperature purifying catalyst comprises the noble metal loaded on the oxide at least a part of which has an oxygen defect by a reduction treatment, the harmful materials. can be removed and purified by the actions of the both of the oxide and the noble metal. Particularly, it is possible to purify even the harmful materials which exist in a trace amount in air. Especially, when the present ordinary-temperature catalyst includes the cerium oxide and the noble metal, it is possible to efficiently remove the formaldehyde in air at room temperature. Thus, the present ordinary-temperature catalyst can reduce the loads to human bodies in the housing environment, and contribute to improving the housing environment.

Further, since the present ordinary-temperature catalyst can decompose and remove the ethylene in an ordinary temperature range, it is possible to suppress the physiological actions of fruit and vegetables so as to inhibit them from chronologically aging additionally. Thus, it is possible to easily keep the freshness of fruit and vegetables.

Furthermore, since the present ordinary-temperature catalyst carries out an oxidation reaction, it yields carbon dioxide and consumes oxygen while it decomposes the ethylene. Accordingly, it is possible to form an optimum gas composition for keeping the freshness of fruit and vegetables whose oxygen concentration is low, carbon dioxide concentration is high and ethylene concentration is low.

Moreover, when the present ordinary-temperature catalyst comprises the activated carbon on which the cerium oxide with an oxygen defect and the noble metal are loaded, the adsorbing ability of the activated carbon can be utilized. Accordingly, it is possible to reduce the amount of the harmful materials which contact with the noble metal and the cerium oxide in a unit period of time. Thus, the catalytically active portions can be inhibited from being poisoned by the adsorbed harmful materials. As a result, it is possible to maintain the purifying performance for a long period of time.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of disclosure.

DETAILED DESCRIPTION OF THE PREFERRED EMBODIMENTS

Figure 1:
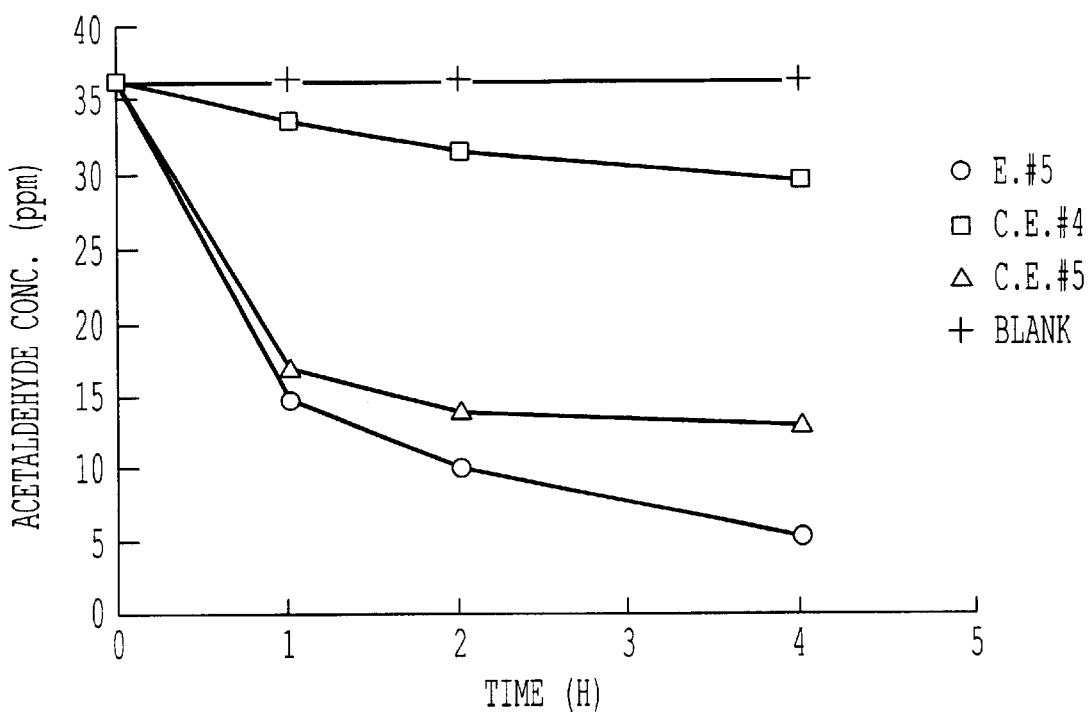
FIG. 1 is a graph for comparing the conversions of 36 ppm acetaldehyde concentration which were exhibited by the samples of Example No. 5 and Comparative Example Nos. 4 an 5 after 1, 2, 3, 24 and 96 hours.

Having generally described the present invention, a further understanding can be obtained by reference to the specific preferred embodiments which are provided herein for the purpose of illustration only and not intended to limit the scope of the appended claims.

The ordinary-temperature purifying catalyst according to the present invention comprises the oxide, into which an oxygen defect is introduced by a reduction treatment, and the noble metal loaded on the oxide. Thus the present ordinary-temperature purifying catalyst can carry out purifying the harmful materials in air at an ordinary temperature.

In the oxide which has an oxygen defect introduced by the reduction treatment, a part of the oxygen forming the oxide is partially eliminated from the oxide by the reduction treatment so that the oxide may have an oxygen defect, thereby activating the oxide. When the noble metal is loaded on the activated oxide, it is possible to maintain the durability and to purify the harmful materials in an ordinary temperature range. The "ordinary temperature" herein means a temperature range selected not to preclude the thus introduced oxygen defect from the oxide, for instance, a temperature falling in a range of a room temperature, in which no special heating and cooling are required, i. e., 50° C. or less, and more preferably it falls in a range of from 10 to 40° C.

As for the oxide, it is possible to employ at least one oxide selected from the group consisting of an oxide of transition metal elements and an oxide of rare-earth elements. As for the oxide of transition metal elements, it is possible to list the oxides of iron, manganese, cobalt, chromium, nickel, copper, yttrium, zirconium, molybdenum, niobium and titanium, which belong to the transition metal group. As for the oxide of rare-earth elements, it is possible to employ the oxides of cerium, neodymium, praseodymium and samarium, which belong to the lanthanum series.

As for the noble metal component loaded on the aforementioned oxide, it is possible to employ at least one element selected from the group consisting of Pt, Pd, Rh, Ir, Au and Ru.

The "oxygen defect introduced by a reduction treatment" herein means that the molar amount of the oxygen bonded to constitute the oxide is smaller than the stoichiometric value. For example, in the case of cerium oxide, the oxygen element is included less than twice molar amount with respect to that of the cerium element. Namely, the oxide is subjected to a reduction action by the reduction treatment hereinafter described so that a part of the oxygen is eliminated, thereby enabling the oxide to have an oxygen defect. Having the oxygen defect, the oxide itself is enhanced in activity, and the adsorption of the harmful materials onto the noble metal is degraded. The oxygen is activated by way of the oxygen defect portion, and the activated oxygen is utilized to develop the oxidation or decomposing reaction of the harmful materials. Thus, it is believed that the harmful materials can be purified in an ordinary temperature range.

The reduction treatment herein described can preferably be carried out so as to process the aforementioned oxide compounded with the noble metal in a temperature range of from 100 to 800° C. in a reducing gas flow for about 1 hour. Namely, when the oxide contacts with the reducing gas at a high temperature, a part of the oxygen of the oxide bonds with the reducing gas, and is thereby removed. As a result, the oxide is to have an oxygen defect. As for the reducing gas employed for the reduction treatment, it is possible to list reducing gases, such as hydrogen and carbon monoxide, hydrocarbons, such as methane, and formaldehyde. The concentration of these reducing gases can preferably fall in a range of from 0.1 to 100% by volume, further preferably in a range from 1 to 100% by volume. Further, a reduction treatment, in which a reducing chemical represented by hydrazine, lithium aluminum hydride, and sodium borohydride is used, enables the aforementioned oxides of transition metal elements and rare-earth elements to have an oxygen defect. The configurations of the raw materials employed in the reduction treatment are not limited in particular.

Among the ordinary-temperature purifying catalysts according to the present invention, there is a specific ordinary-temperature purifying catalyst which comprises the cerium oxide and the zirconium oxide as the oxide, and the noble metal. In this catalyst, mainly at least a part of the cerium oxide has an oxygen defect by the reduction treatment Accordingly, the catalyst exhibits an activity in an ordinary temperature range, and can purify the harmful materials, such as carbon monoxide and nitrogen oxides, and the odoring organic materials, such as amine, mercaptan and aldehyde, which are contained in air, by oxidizing and decomposing them at an ordinary temperature.

A purifying reaction of the odorant by the ordinary-temperature purifying catalyst can preferably be carried out at a purifying reaction temperature of 25° C., thereby yielding a conversion of 50% or more at 20 minutes after starting the purifying reaction. In this instance, the initial concentration of the odorant can be 100 ppb and the space velocity can be 600,000 $hr^{-1}$ when the odorant is formaldehyde, for example.

A purifying reaction of the carbon monoxide by the ordinary-temperature purifying catalyst can preferably be carried out at a purifying reaction temperature of 25° C. at a space velocity of 120,000 $hr^{-1}$, thereby yielding a conversion of 40% or more at 30 minutes after starting the purifying reaction. In this instance, the initial concentration of the carbon monoxide can be 220 ppm.

The term, "in air", herein involves that an object is in atmospheric air or air having exhaust gases emitted from internal combustion engines. In addition, it specifies that an object is in air within housing spaces and in air within passenger compartments. Thus, it implies that an object is in air within what is called living spaces in general.

When the present ordinary-temperature purifying catalyst is a mixture of the cerium oxide and the zirconium oxide, it is preferred that both of the cerium oxide and the zirconium oxide exist in a form of a solid solution, a composite oxide, or a mixture thereof. When the cerium oxide and the zirconium oxide form a solid solution, a composite oxide, or a mixture thereof, the oxygen defect is likely to be formed in the oxide, and the oxygen defect formed by the reduction treatment can be kept stably. Thus, it is possible to maintain the catalytic activity in an ordinary temperature range for a long period of time. Therefore, the ordinary-temperature purifying catalyst can further efficiently purify the harmful materials in air in an ordinary temperature range for a long period of time.

The ordinary-temperature purifying catalyst according to the present invention can include a third component in addition to the noble metal and the cerium oxide and the zirconium oxide which have an oxygen defect. The third component can be at least one oxide selected from the group consisting of an oxide of rare-earth elements, such as yttrium, lanthanum, neodymium and praseodymium, and an oxide of transition metals, such as iron, manganese, cobalt, chromium, nickel and copper. Compounding the third component contributes to stably maintaining the oxygen defect of the cerium oxide and the zirconium oxide, and to keeping the purifying performance.

When both of the cerium oxide and the zirconium oxide are used, the compounding molar ratio of Ce and Zr can preferably fall in a range of 100:1–1:100, further. preferably in a range of 20:1–1:10 furthermore preferably in a range of 5:1–1:1. When the compounding molar ratio falls in the range, the aforementioned oxygen defect can be maintained stably. The cerium oxide can preferably be included more than the zirconium oxide. If such is the case, it is likely to form the oxygen defect.

The amount of the noble metal can preferably fall in a range of from 0.01 to 20% by weight, further preferably in a range of from 0.6 to 3.0% by weight, with respect to the oxides of cerium and zirconium. When the amount of the noble metal is less than 0.01% by weight, it is not preferred because the catalytic activity cannot be obtained. When it is more than 20% by weight, it is not preferred because the purifying efficiency is not improved in proportion to the addition, and because the expensive noble metal is used in a large amount so that the cost goes up.

The solid solution or the composite oxide of cerium and zirconium can be optimally formed by the coprecipitation method. It is possible to use the other methods as far as the solid solution or the composite oxide are synthesized by the aforementioned compounding ratio. The precipitates formed by the coprecipitation method can be made into the oxide, for example, by a heat treatment.

The noble metal can be loaded on the cerium oxide and the zirconium oxide by the impregnation method, the drying method, the supercritical fluid method, etc. Further, when the composite oxide is formed by the coprecipitation method, the noble metal can be coexisted. After loading the noble metal, the oxygen defect is formed in the oxide by carrying out the so-called reduction treatment with the reducing gas as set forth above. Thus, the catalytic activity can be given to the catalyst.

The noble metal loaded on the present ordinary-temperature purifying catalyst can preferably have a particle diameter of 5 nm or less, further preferably 1 nm or less, in order to keep the activity of the catalyst.

It is possible to use the aforementioned catalytic ingredients by loading them on at least one support selected from the group consisting of titanium oxide, alumina, silica, zeolite, sepiolite and activated carbon, which are usually known as a catalyst support. Namely, it is possible to use the catalytic ingredients by loading them on the above-selected support and by forming them as a pellet shape. Further, it is possible to use them by loading them on a honeycomb-shaped substrate.

The mechanism of the present ordinary-temperature purifying catalyst is still under investigation. However, it is assumed as follows. The aforementioned cerium oxide and/or zirconium oxide are made to have an oxygen defect partially at least by the reduction treatment, and thereby the oxygen is activated by the oxides. The reactivity of the activated oxygen is further enhanced on the noble metal, and thereby the oxidation reaction by the noble metal is facilitated. In addition, the existence of the oxygen defect degrades the adsorption of the odorants and the harmful materials to the noble metal, and the purifying reactions of the odorants, the carbon monoxide, the nitrogen oxides, etc., are developed. Then, the cerium oxide and zirconium oxide facilitate oxides, which result from the purification, to eliminate from the catalytically active sites. Thus, the present ordinary-temperature purifying catalyst carries out purifying. Hence, it is assumed that the catalytically active sites of the noble metal are inhibited from the adsorption poisoning, and that the catalytic activity is maintained in an ordinary temperature range so that the purifying performance is improved.

The reduction treatment can be carried out in the same manner as that of the aforementioned oxide. It is preferred that the compounded and formed catalyst is processed in a temperature range of from 100 to 800° C. in a reducing gas flow. When the processing temperature is less than 100° C., it is not preferred because the reduction does not develop, and because the desired oxygen defect cannot be formed. When the processing temperature exceeds 800° C., it is not preferred because the specific surface area of the resulting oxide is reduced so that the catalytic activity decreases.

As for the reducing gas it is possible to list hydrogen, carbon monoxide and hydrocarbons, such as methane. Further, it is possible to list a reducing gas, such as formaldehyde. The concentration of these reducing gases can preferably fall in a range of from 0.1 to 100% by volume. However, in addition to the aforementioned reducing gases, it is possible to carry out the reduction treatment by chemicals. Thus, the way of carrying out the reduction treatment is not limited in particular For example, when the cerium oxide and the zirconium oxide are subjected to a reduction treatment at 500° C., a sum of their specific surface areas can preferably be 50 m$^2$/g or more. Further, when the cerium oxide and the zirconium oxide are subjected to a reduction treatment at 800° C., a sum of their specific surface areas can preferably be 15 m$^2$/g or more.

In the present ordinary-temperature purifying catalyst, which comprises the cerium oxide and the noble metal, and in which at least a part of the cerium oxide has an oxygen defect, due to the noble metal and the cerium oxide a part of which has an oxygen detect, the catalyst exhibits a good effect in purifying the harmful substances in an ordinary temperature range in particular.

The aforementioned present ordinary-temperature purifying catalyst, including the cerium oxide and the noble metal, exhibits a good effect in purifying the formaldehyde in air in particular, when the cerium oxide is subjected to a reduction treatment so that it exists in a state of an oxygen defect in which the compositional ratio "n" in a formula CeO$_n$ falls in a range of $1.5 \leq n < 2$, further preferably in a range of $1.5 \leq n \leq 1.8$. It is difficult to make an oxygen defect whose value "n" is less than 1.5 under the conditions of an ordinary reduction and elemental analysis. Further, it is necessary for the value "n" to be less than 2 in order to form an oxygen defect. When an oxygen defect in which the value "n" is 1.8 or less, a sufficient activity can be obtained as a catalyst. The oxygen deficient state of the oxide can be measured by the X-ray diffraction, for example.

It is preferred that the oxygen defect is $1.5 \leq n \leq 1.8$ in the surface layer of the cerium oxide particle in order to enhance the catalytic activity. The "surface layer" herein means a layer portion with a thickness of 100 nm from the surface.

The amount of the noble metal loaded on the cerium oxide can preferably be from 0.1 to 20 g, further preferably from 0.5 to 5 g, with respect to 150 g of the cerium oxide. When the noble metal is thus included, it is possible to purify the harmful materials in an ordinary temperature range. When it is less than 0.1. g, it is not preferred because the catalytic activity cannot be obtained. When the noble metal is used in an amount of more than 20 g, it is not preferred because the purifying efficiency is not improved in proportion to the addition, and because the expensive noble metal is used in a large amount so that the cost goes up.

As for the noble metal component, it is possible to use at least one member selected from the group consisting of Pt, Pd. Rh, Au and Ru. The noble metal can be loaded on the cerium oxide by the impregnation method, the drying method, the supercritical fluid method, etc. After loading the noble metal, the noble metal is subjected to the reduction treatment by using hydrogen, etc., as set forth in the above-described catalyst, so that the cerium oxide is turned into a state of an oxygen detect. Thus, it is possible to obtain the catalytic activity.

The reduction treatment can be carried out in the same manner as that of the aforementioned oxide. It is preferred that the compounded and formed catalyst is processed in a temperature range of from 100 to 800° C. in a reducing gas flow. As for the reducing gas, it is possible to list hydrogen, carbon monoxide and hydrocarbons, such as methane. Further, it is possible to list a reducing gas, such as formaldehyde. The concentration of these reducing gases can preferably fall in a range of from 0.1 to 100% by volume. However,in addition to the aforementioned reducing gases, it is possible to carry out the reduction treatment by chemicals. Thus, the way of carrying out the reduction treatment is not limited in particular.

Similarly to the above-described catalyst, it is also possible to use this catalyst by loading it on at least one support selected from the group consisting of alumina, silica, zeolite, titanium oxide, cordierite, activated carbon and a clay mineral, represented by sepiolite. Further, it is possible to coat the catalytic ingredients on a substrate in a form of the particles, or it is possible to load them on the above-selected support and to form them as a pellet shape. Furthermore, it is possible to use them by loading them on a honeycomb-shaped substrate.

By constituting the cerium oxide and the noble metal as the catalytic ingredients, it is possible to purify formaldehyde, the volatile organic compounds, which are referred to as "VOC", and the odorants in an ordinary temperature range.

The ordinary-temperature purifying catalyst according to the present invention can effectively purify the ethylene, which is considered to generate from fruit and vegetables to degrade the freshness off perishables.

In the present ordinary-temperature purifying catalyst used for purifying ethylene, it is possible to include at least one oxide selected from the group consisting of yttrium oxide, lanthanum oxide, iron oxide, manganese oxide and copper oxide as a third component in the catalyst composition. When perishables are placed in an environment for preserving the freshness, for example, cases and container boxes, these third components help maintaining the freshness. This can be done by passing the air, which is introduced into the environment and thereafter is brought into contact with the perishables, through the present catalyst including the third component.

In this case, the shape of the present ordinary-temperature purifying catalyst can be a particulate shape, a monolithic shape and a filter shape. Alternatively, the catalyst can be coated on an inner wall of a container wall. Further, the catalyst can be wrapped with an air permeable material. By using the catalyst, it is possible to decompose the ethylene at an ordinary temperature or less. Accordingly, it is possible to suppress the physiological actions of fruit and vegetables so as to inhibit them from chronologically aging additionally. Thus, it is possible to easily keep the freshness of fruit and vegetables. Furthermore, since the catalyst carries out an oxidation reaction, it yields carbon dioxide and consumes oxygen while it decomposes the ethylene. Accordingly, it is possible to form an optimum gas composition for keeping the freshness of fruit and vegetables whose oxygen concentration is low, carbon dioxide concentration is high and ethylene concentration is low.

The mechanism of the present ordinary-temperature purifying catalyst is not understood certainly. However, it is assumed as follows. The existence of the oxygen with an oxygen defect, e.g., a cerium oxide with an oxygen defect, activates the noble metal, and materials to be purified were degraded in adsorption onto the noble metal. In addition, the oxygen is activated by way of the oxygen defect, and reacts with the materials to be purified, such as the ethylene, thereby eliminating them as oxides. Thus, the noble metal is inhibited from the adsorption poisoning so that the catalytic activity is maintained in an ordinary temperature range and the purifying performance is improved.

It is possible to use the present ordinary-temperature purifying catalyst a room ordinary temperature. However, the present catalyst can be used at an ordinary temperature range so far as the oxygen defect does not disappear, that is, the present catalyst exhibits the good effects sufficiently not only when it is used at a room temperature, but also when it is used in a temperature range at around about 100° C. However, when the present catalyst is exposed at a temperature of 200° C. or more for a long period of time, the oxygen defect disappears, and the high activity is lost. Accordingly, the service temperature can preferably be at 200° C. or less, further preferably at 100° C. or less.

The ordinary-temperature purifying catalyst according to the present invention can include activated carbon. It is preferred that a cerium oxide, at least a part of which has an oxygen defect, is included as the oxide. In this arrangement, due to the mutual action of the oxide and the noble metal in addition to the adsorption ability of the activated carbon, it is possible to maintain not only the purifying reaction at an ordinary temperature but also the purifying performance for a long period of time.

In the present ordinary-temperature purifying catalyst, it is preferred that the reduction treatment is carried out in a range of from 200 to 600° C. in order to inhibit the activated carbon from burning and disappearing. When the present catalyst is subjected to the reduction treatment under the condition, the activated carbon is held therein and the cerium oxide is to have an oxygen defect. Thus, it is possible to give the present catalyst the high performance to remove the environmental loading material, to start With, formaldehyde, acetaldehyde and carbon monoxide.

The present ordinary-temperature purifying catalyst degrades less in terms of the purifying ability, compared with the conventionally known activated carbon. For instance, when the activated carbon was examined for the CO conversion by a one-pass test under a gas flow which was composed of CO in an amount of 250 ppm, oxygen in an amount of 20% and the balance of nitrogen, the activated carbon exhibited a CO conversion of 20% at 1 hour after starting the reaction. Whilst, the present catalyst could maintain a CO conversion of 70% under the same testing conditions.

The purification of the acetaldehyde is hereinafter described as an example. The acetaldehyde adsorbs onto the activated carbon, and thereafter is purified by the catalytic action of the $Pt/CeO_2$, which exists in proximity to the activated carbon, before the activated carbon is saturated in terms of the adsorption. Thus, the acetaldehyde can be purified. As a result, it is possible to inhibit the adsorption removing performance from degrading, Further, since the materials to be purified adsorb onto the activated carbon, it is possible to reduce the amounts of the reactants which contact, for example, with the $Pt/CeO_2$ having the catalytic action, in a unit period of time. Thus, it is possible to inhibit the adsorbed materials from poisoning the $Pt/CeO_2$, and it is thereby possible to maintain the catalytic purifying performances It is preferred that the present ordinary-temperature purifying catalyst is used by loading it on a support or by forming it as a pellet shape or a honeycomb shape.

The present invention will be hereinafter described in detail with reference to preferred examples.

EXAMPLE NO. 1

2 g of Pt was loaded with respect to 150 g of a cerium oxide powder. The resulting powder was pelletized to have a diameter of from 1 to 2 mm. Thereafter, the powder was subjected to a reduction treatment in an $N_2$ gas, containing $H_2$ in an amount of 5%, at 500° C. for 1 hour. Thus, an ordinary-temperature purifying catalyst of Example No. 1 was prepared.

EXAMPLE NO. 2

A first mixture aqueous solution was prepared, in which cerium (III) nitrate and zirconium nitrate were solved in a molar ratio of Ce/Zr=5/1. While stirring the first aqueous solution, ammonia water was dropped to neutralize and precipitate the first aqueous solution. Subsequently, a second mixture aqueous solution was dropped, mixed and stirred in the first aqueous solution, second aqueous solution which contained hydrogen peroxide water in an amount of 1/2 mol with respect to the cerium ions included in the first aqueous solution and 10% by weight of alkylbenzene sulfonic acid with respect to the weight of the resulting oxide.

The resulting slurry was dried, and also the coexisting ammonium nitrate was evaporated, decomposed and removed. Thus, an oxide solid solution powder $CeO_2.ZrO_2$ was obtained.

2 g of Pt was loaded with respect to 150 g of the oxide solid solution powder $CeO_2.ZrO_2$. The solid solution powder with Pt loaded was pelletized to have a diameter of from 1 to 2 mm. Thereafter, the powder was reduced by hydrogen in a reducing atmosphere under the conditions similar to those of Example No. 1. Thus, an ordinary-temperature purifying catalyst of Example No. 2 was prepared.

EXAMPLE NO. 3

Except that the Ce/Zr molar ratio was changed to 1/1, an ordinary-temperature purifying catalyst of Example No. 3 was prepared by the same operations as those of Example No. 2.

EXAMPLE NO. 4

6 L of an aqueous solution ("A" solution), in which aluminum nitrate, zirconium nitrate and cerium nitrate were solved and mixed in a molar ratio of 2.4:0.25:0.25, and a solution ("B" solution), in which ammonium water and ammonium carbonate were mixed and solved in a molar ratio of 8.3:0.08 were prepared, and the "A" solution and the "B" solution were mixed and stirred. After oxide precursors, which were precipitated from the mixture solution, were washed, they were dried, and they were burned at 650° C. for 1 hour. Thus, a composite oxide, in which alumina, ceria and zirconia were dispersed uniformly, was obtained. Hereinafter, the composite oxide was subjected to a reduction treatment under the same conditions as those of Example No. 2, thereby preparing an ordinary-temperature purifying catalyst of Example No. 4.

Comparative Example No. 1

A catalyst of Comparative Example No. 1 was a catalyst, which was not subjected to the reduction treatment in the catalyst preparation process of Example No. 2.

Comparative Example No. 2

2 g of Pt was loaded with respect to 150 g of a silicon oxide powder, and the resulting powder was pelletized to have a diameter of from 1 to 2 m. Thereafter, the powder was reduced by hydrogen in a reducing atmosphere under the conditions similar to those of Example No. 1.

Comparative Example No. 3

By using cerium nitrate, chloroplatinic acid and solid NaOH, a $Pt/CeO_2$ powder was prepared by the coprecipitation method. The loading amount of Pt was 2 g with respect to 150 g of $CeO_2$. The resulting precipitates were filtered and washed. Thereafter, the precipitates were burned at 500° C. This catalyst was not subjected to a reduction treatment.
(Evaluation on the Catalysts)

Each of the catalysts prepared as aforementioned was evaluated on the CO purifying performance under the following conditions.

The measurements on the CO conversion were carried Out under the conditions; namely; CO: 220 ppm, $O_2$: 20%, N: balance, 5 L/min of the flow rate, 120,000 $hr^{-1}$ of the space velocity, and at an ordinary temperature. The CO conversions were obtained by measuring the remaining CO concentrations after starting the reaction and 30 minutes were elapsed. The results are set forth in Table 1.

TABLE 1

| | Catalyst Composition | Reduction Treatment | Evaluation Temp. Inlet Gas Temp. | CO Coversion |
|---|---|---|---|---|
| E. No. 1 | $Pt/CeO_2$ | done | 25° C. | 60% |
| E. No. 2 | $Pt/CeO_2 \cdot ZrO_2$ | done | 25° C. | 78% |
| E. No. 3 | $Pt/CeO_2 \cdot ZrO_2$ | done | 25° C. | 42% |
| E. No. 4 | $Pt/Al_2O_3 \cdot CeO_2 \cdot ZrO_2$ | done | 25° C. | 55% |
| C. E. No. 1 | $Pt/CeO_2 \cdot ZrO_2$ | none | 25° C. | 0% |
| C. E. No. 2 | $Pt/SiO_2$ | done | 25° C. | 5% |
| C. E. No. 3 | $Pt/CeO_2$ | none | 25° C. | 15% |

Note that, when the catalyst of Example No. 3 was measured for the CO conversion under the condition that the space velocity was lowered to 24,000 $hr^{-1}$, the CO conversion was 100%.

The catalysts of the examples arranged as aforementioned are verified that they could purify CO to $CO_2$ at an ordinary temperature (e.g., room temperature).

In particular, as set forth in Example No. 1 through Example No. 4, since an oxygen deficient state is formed in the oxides, such as cerium oxide, it is possible to enhance the purifying reaction by the noble metal at room temperature.

In order to maintain the cerium oxide in an oxygen deficient state, it is preferred that the cerium oxide exists as a $CeO_2.ZrO_2$ composite oxide or solid solution (Example No. 2 through Example No. 4). Further, as set forth in Example No. 2, the conversion efficiency is further enhanced when the molar content of $CeO_2$ is large (e.g., when it is larger than Example No. 3).

Comparative Example No. 1 had the same composition as that of Example No. 2, but was not subjected to the reduction treatment. Accordingly, since the oxides did not form an oxygen deficient state, Comparative Example 1 did not exhibit a purifying action at an ordinary temperature. Since Comparative Example No. 2 employed oxides of silicon, which are not oxides specified in the present invention, it exhibited a low CO conversion even if it was subjected the reduction treatment. Comparative Example No. 3 also had the same composition as that of Example No. 1, however, since it was not subjected to the reduction treatment, it exhibited a low Co conversion at an ordinary temperature. Hence, the oxides, which are specified in the present invention, and which can form an oxygen deficient state by the reduction treatment, are effective as an ordinary-temperature purifying catalyst.

EXAMPLE NO. 5

By using a catalyst sample, which was the same as Example No. 2, but which was subjected to a reduction treatment in an $N_2$ gas containing 5% $H_2$ at 500° C. for 1 hour, a purifying performance of acetaldehyde was evaluated.

An amount of catalyst was 0.1 g.

An evaluation gas was 5 L of acetaldehyde (20% $O_2$ and the balance of $N_2$).

Initial concentrations of acetaldehyde were 36 ppm, 72 ppm and 270 ppm.

The evaluation method was as follows. Gas containers (made by ohmi Odor Air Service Co., Ltd.) for an odor analysis, in which the samples and the evaluation gas were placed, were stood still at room temperature, and the remaining acetaldehyde concentrations in the containers after 1 hour, after 2 hours, after 3 hours, after 24 hours and after 96 hours were measured quantitatively. Then, the concentrations of removed acetaldehyde were calculated from the difference between the concentrations in the blank container, which was free from the catalyst samples, and the concentrations in the sample containers.

Comparative Example No. 4

A catalyst, which was prepared in Example No. 2, but which was not subjected to the reduction treatment, was regarded as a sample of Comparative Example No. 4. The sample was evaluated in the same manner as Example No. 5.

Comparative Example No. 5

Comparative Example No. 5 used an activated carbon powder as a catalyst, and was evaluated under the same conditions as Example No. 5.

Figure 2:
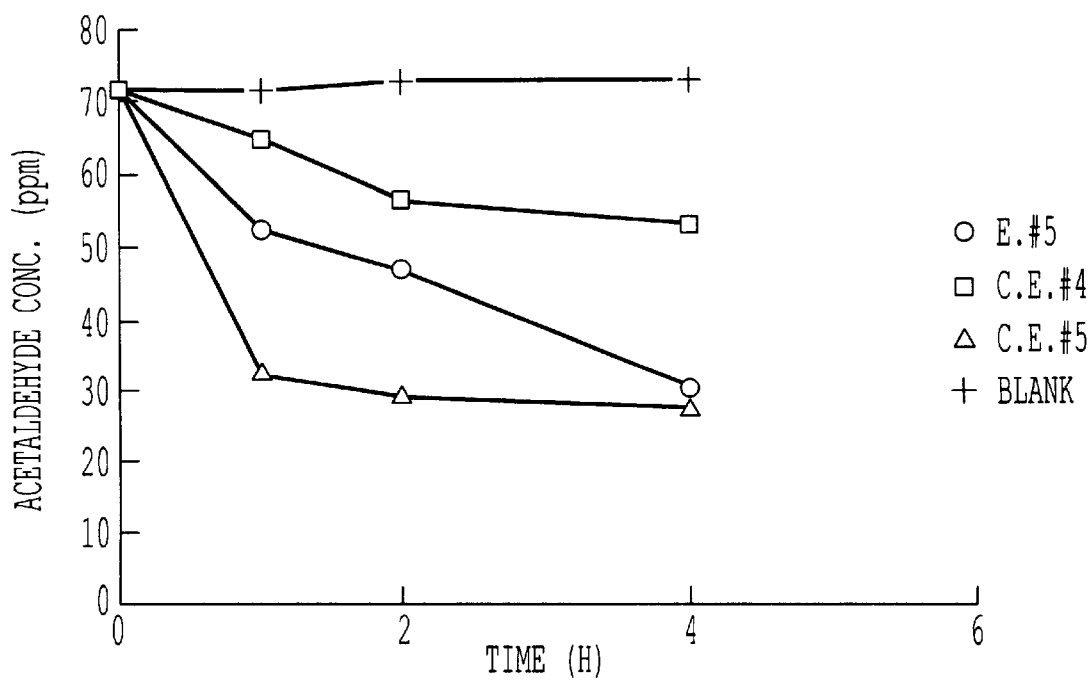
FIG. 2 is a graph for comparing the conversions of 72 ppm acetaldehyde concentration which were exhibited by the samples of Example No. 5 and Comparative Example Nos. 4 an 5 after 1, 2, 3, 24 and 96 hours.
Figure 3:
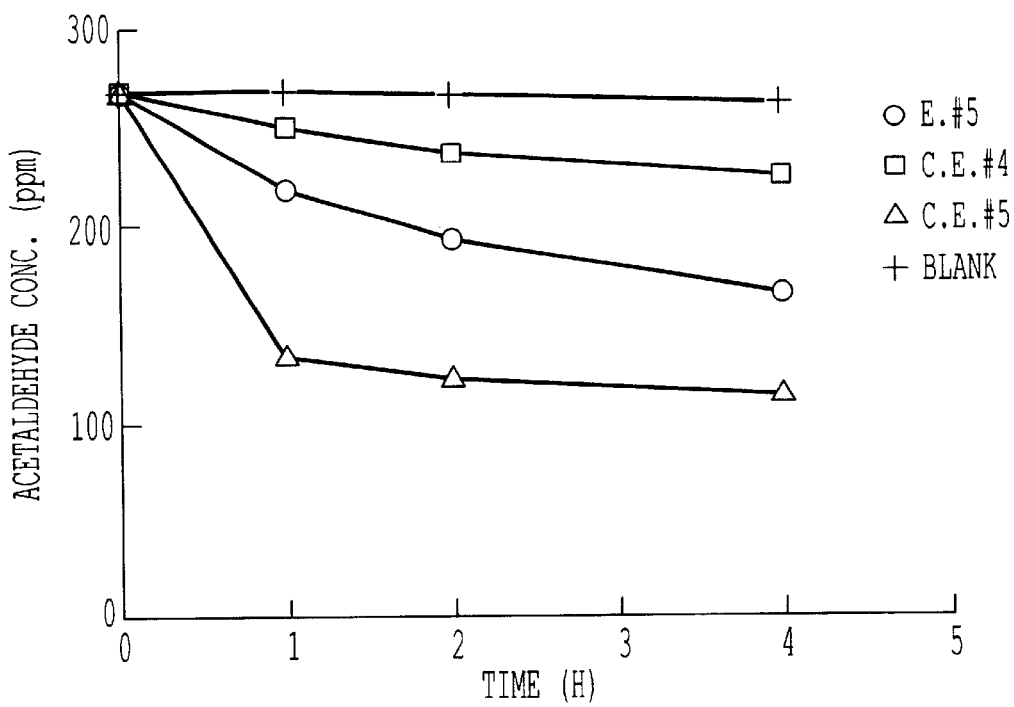
FIG. 3 is a graph for comparing the conversions of 270 ppm acetaldehyde concentration which were exhibited by the samples of Example No. 5 and Comparative Example Nos. 4 an 5 after 1, 2, 3, 24 and 96 hours.

The results are shown in FIG. 1 (36 ppm of the initial concentration), FIG. 2 (72 ppm of the initial concentration) and FIG. 3 (270 ppm of the initial concentration).

The acetaldehyde removing amounts exhibited by Comparative Example No. 4 (without the reduction treatment) were lower at each of concentrations than those of Comparative Example No. 5 which used the activated carbon.

The acetaldehyde removing amounts exhibited by Example No. 5 according to the present invention were shown that they were higher than those of the activated carbon of Comparative Example 5. Hence, it is shown that the catalyst of Example No. 5 had an ability of purifying acetaldehyde at an ordinary temperature.

EXAMPLE NO. 6

0.1 g of the present catalyst sample, which was used in Example No. 5, was used to examine for the formaldehyde purifying ability.

An evaluation gas was 5 L of formaldehyde (20% $O_2$ and the balance of $N_2$).

The evaluation method was as follows. A gas container (made by Ohmi odor Air Service Co., Ltd.) for an odor analysis, in which the catalyst sample and the evaluation gas were placed, were stood still at room temperature, and the remaining formaldehyde concentrations in the container after 1 hour, after 3 hours and after 24 hours were measured by a formaldehyde detector tube (made by GL Science Co., Ltd.), thereby obtaining a chronological variation of the formaldehyde concentration in the container.

Comparative Example No. 6

The activated carbon, which was used in Comparative Example No. 5, was used, and was evaluated in the same manner as Example No. 6. The results are shown in FIG. 4.

Figure 4:
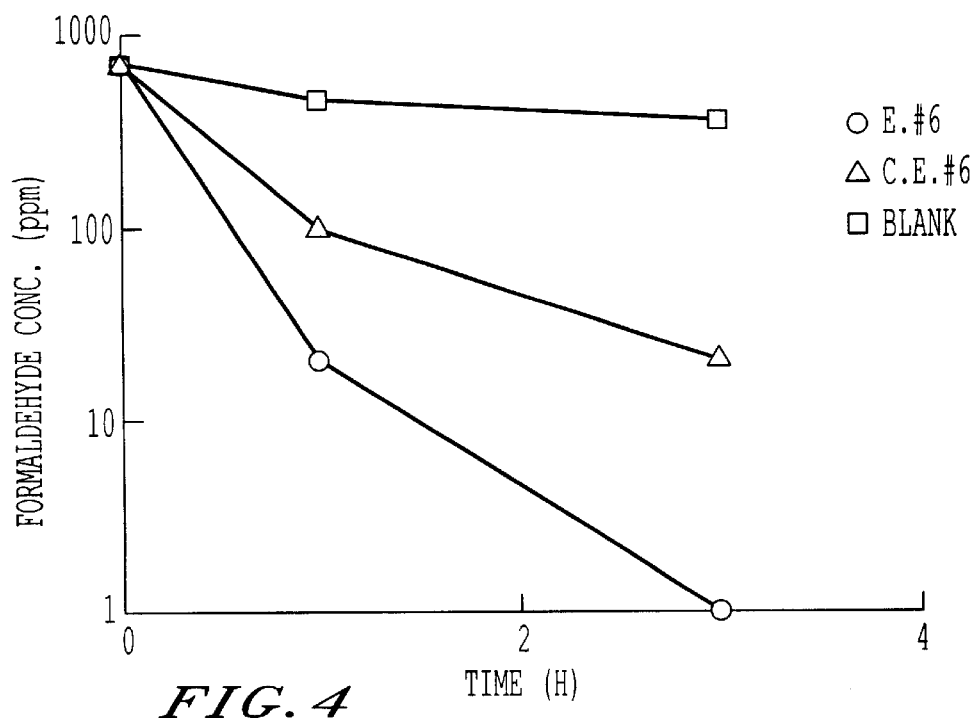
FIG. 4 is a graph for comparing the conversions of formaldehyde which were exhibited by the catalyst of Example No. 6 and Comparative Example No. 6 employing activated carbon.

As illustrated in FIG. 4, it is understood that the formaldehyde purifying performance exhibited by the sample of Example No. 6 was higher than that of the activated carbon of Comparative Example No. 6. Hence, this catalyst is shown that it can purify formaldehyde at an ordinary temperature.

EXAMPLE NO. 7

0.1 g of the catalyst, which was used in Example No. 5, was used to examine for the methyl mercaptan purifying ability.

An evaluation gas was 5 L of methyl mercaptan (20% $O_2$ and the balance of $N_2$).

The evaluation method was as follows. A gas container (made by Ohmi Odor Air Service Co., Ltd.) for an odor analysis, in which the sample and the evaluation gas were placed, were stood still at room temperature, and the remaining methyl mercaptan concentrations in the container after 1 hour, after 3 hours and after 24 hours were measured by an "FPD" type gas chromatograph (GC-15A made by Shimazu Co., Ltd.), thereby obtaining a chronological variation of the methyl mercaptan concentration in the container.

Comparative Example No. 7

Except that the activated carbon, which was used in Comparative Example No. 5, was used, the purifying performance was evaluated in the same manner as Example No. 7. The results are shown in FIG. 5.

Figure 5:
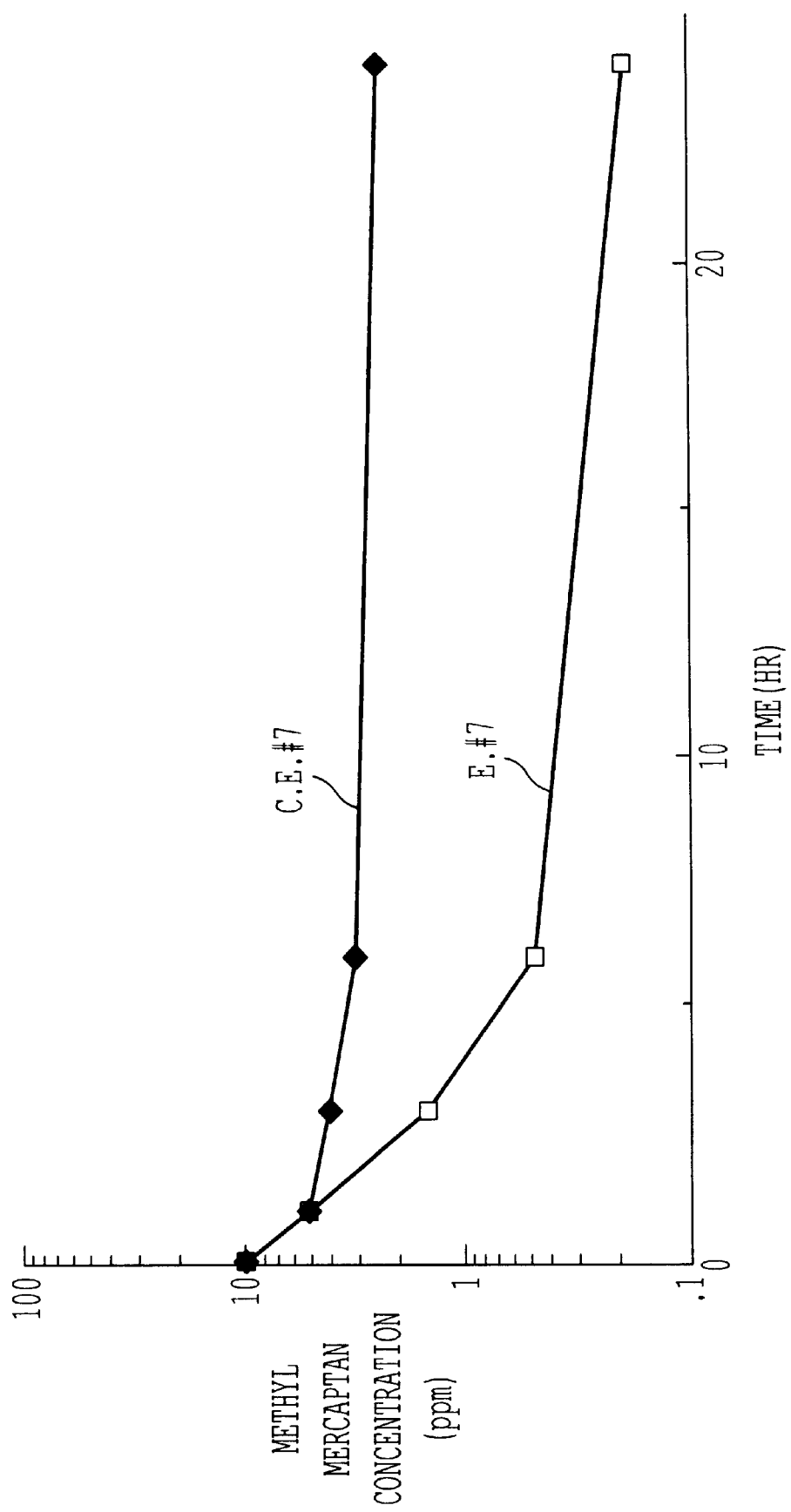
FIG. 5 is a graph for comparing the conversions of methyl mercaptan which were exhibited by the catalyst of Example No. 7 and Comparative Example No. 7 employing activated carbon.

As illustrated in FIG. 5, it is understood that the methyl mercaptan purifying performance exhibited by Example No. 7 was higher than that of the activated carbon of Comparative Example No. 7, Hence, this catalyst is shown that it can purify odor materials, such as methyl mercaptan, at an ordinary temperature.

EXAMPLE NO. 8

0.1 g of the present catalyst, which was used in Example No. 5, was used to examine for the trimethylamine purifying activity.

An evaluation gas was 5 L of trimethylamine (20% $O_2$ and the balance of $N_2$).

The evaluation method was as follows. A gas container (made by Ohmi Odor Air Service Co., Ltd.) for an odor analysis, in which the sample and the evaluation gas were placed, were stood still at room temperature, and the remaining trimethylamine concentrations in the container after 1 hour, after 3 hours and after 24 hours were measured by an "FTD" type gas chromatograph (GC-14A made by Shimazu Co., Ltd.), thereby obtaining a chronological variation of the trimethylamine concentration in the container.

Comparative Example No. 8

Except that the activated carbon, which was used in Comparative Example No. 5, was used, the purifying performance was evaluated in the same manner as Example No. 8. The results are shown in FIG. 6.

Figure 6:
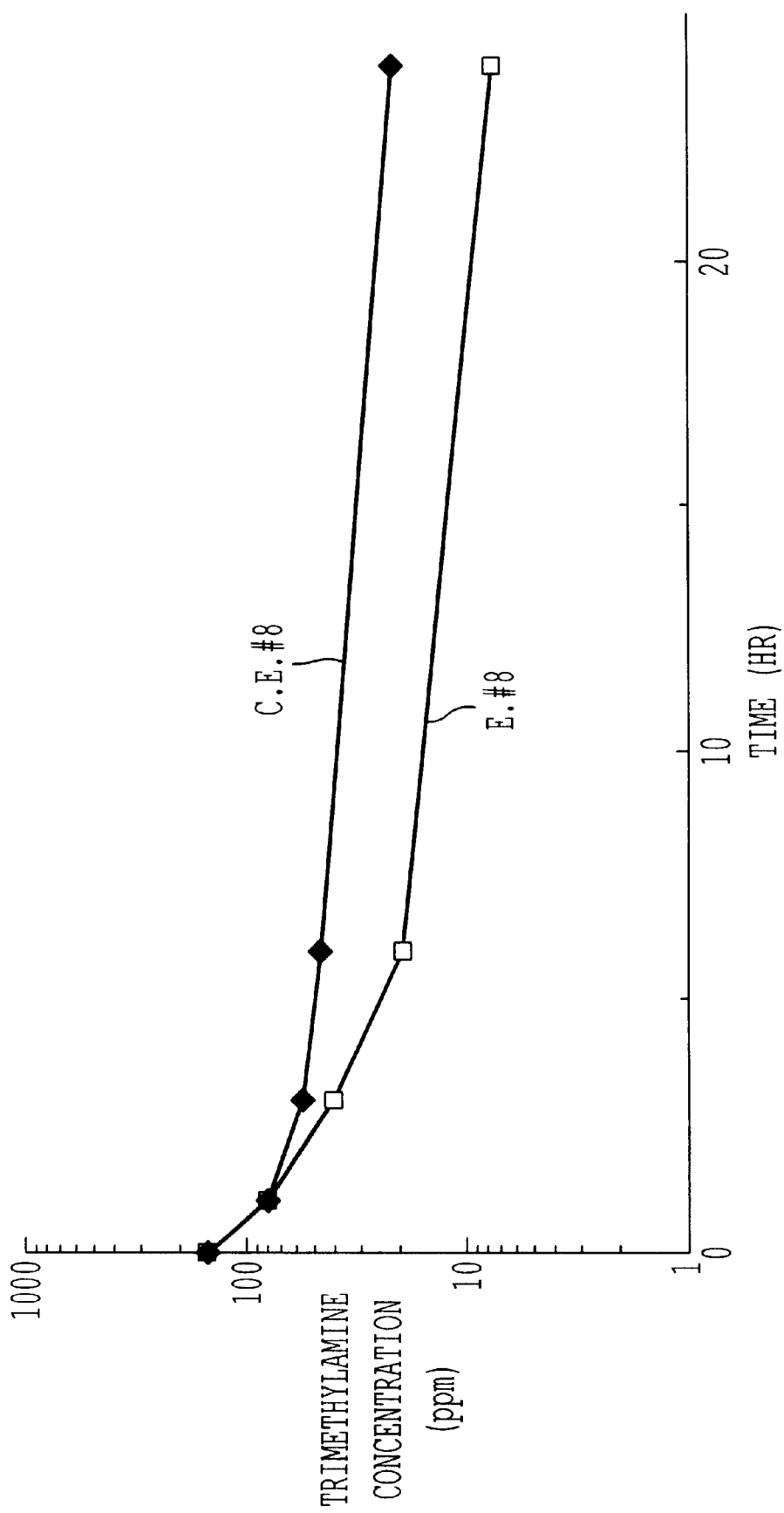
FIG. 6 is a graph for comparing the conversions of trimethylamine which were exhibited by the catalyst of Example No. 8 and Comparative Example No. 8 employing activated carbon.

As illustrated in FIG. 6, it is understood that the trimethylamine purifying performance exhibited by Example No. 8 was higher than that of the activated carbon of Comparative Example No. 8. Hence, this catalyst is shown that it can purify odor materials, such as trimethylamine, at an ordinary temperature.

(Preparation of Catalyst Samples)

EXAMPLE NO. 9

An aqueous solution having a predetermined concentration of Pt salt (Platinum P Salt made by Tanaka Noble Metal Co., Ltd.) was impregnated into a cerium oxide powder in a predetermined amount. The aqueous solution was evaporated and dried, and was thereafter burned at 500° C. in air for 2 hours, thereby loading Pt. At this time, the loading amount of Pt in the cerium oxide powder was 1 g with respect to 150 g of the cerium oxide powder. Thereafter, the cerium oxide powder was treated in an $N_2$ gas, containing $H_2$ in an amount of 5%, at 500° C. for 1 hour. According to the x-ray diffraction and the elemental analysis, the ratio of Ce and O in the powder was 1:1.9 at this time.

EXAMPLE NO. 10

Except that the ratio of Ce and O was prepared to be 1:1.8, a catalyst powder of Example No. 10 was prepared in the same manner as Example No. 9.

EXAMPLE NO. 11

Except that the ratio of Ce and O was prepared to be 1:1.7, a catalyst powder of Example No. 11 was prepared in the same manner as Example No. 9.

EXAMPLE NO. 12

Except that the ratio of Ce and O was prepared to be 1:1.65, a catalyst powder of Example No. 12 was prepared in the same manner as Example No. 9.

EXAMPLE NO. 13

Except that the ratio of Ce and O was prepared to be 1:1.6, a catalyst powder of Example No. 13 was prepared in the same manner as Example No. 9.

EXAMPLE NO. 14

Except that the ratio of Ce and O was prepared to be 1:1.55, a catalyst powder of Example No. 14 was prepared in the same manner as Example No. 9.

EXAMPLE NO. 15

Except that the ratio of Ce and O was prepared to be 1:1.5, a catalyst powder of Example No. 15 was prepared in the same manner as Example No. 9.

EXAMPLE NO. 16

Except that the loading amount of Pt was 0.1 g with respect to 150 g of the cerium oxide, and that the ratio of Ce and O was prepared to be 1:1.8, a catalyst powder of Example No 16 was prepared in the same manner as Example No. 9.

EXAMPLE NO. 17

Except that the loading amount of Pt was 0.5 g with respect to 150 g of the cerium oxide, a catalyst powder of Example No. 17 was prepared in the same manner as Example No. 16.

EXAMPLE NO. 18

Except that the loading amount of Pt was 5 g with respect to 150 g of the cerium oxide, a catalyst powder of Example No. 18 was prepared in the same manner as Example No. 16.

EXAMPLE NO. 19

Except that the loading amount of Pt was 15 g with respect to 150 g of the cerium oxide, a catalyst powder of Example No. 19 was prepared in the same manner as Example No. 16.

EXAMPLE NO. 20

Except that the loading amount of Pt was 17 g with respect to 150 g of the cerium oxide, a catalyst powder of Example No. 20 was prepared in the same manner as Example No. 16.

EXAMPLE NO. 21

Except that the loading amount of Pt was 0.01 g with respect to 150 g of the cerium oxide, a catalyst powder of Example No. 21 was prepared in the same manner as Example No. 16.

EXAMPLE NO. 22

Except that Pd was loaded instead of Pt in an mount of Pt was 1 g with respect to 150 g of the cerium oxide, a catalyst powder of Example No. 22 was prepared in the same manner as Example No. 16.

EXAMPLE NO. 23

Except that Rh was loaded instead of Pt in an amount of 1 g with respect to 150 g of the cerium oxide, a catalyst powder of Example No. 23 was prepared in the same manner as Example No. 16.

EXAMPLE NO. 24

Except that Au was loaded instead of Pt in an amount of 1 g with respect to 150 g of the cerium oxide, a catalyst powder of Example No. 24 was prepared in the same manner as Example No. 16.

EXAMPLE NO. 25

Except that Ru was loaded instead of Pt in an amount of 1 g with respect to 150 g of the cerium oxide, a catalyst powder of Example No. 25 was prepared in the same manner as Example No. 16.

EXAMPLE NO. 26

Except that Pt was loaded in an amount of 1 g with respect to 150 g of cerium oxide, and that Pd was loaded in an amount of 1 g with respect to 150 g of the cerium oxide, a catalyst powder of Example No. 26 was prepared in the same manner as Example No. 16.

Comparative Example No. 9

Except that the ratio of Ce and O was prepared to be 1:2.0: namely; the reduction treatment was not carried out, a catalyst powder of Comparative Example No. 9 was prepared in the same manner as Example No. 9.

Comparative Example No. 10

An activated carbon (BFG-3 made by Cataler Co., Ltd.) was used instead of the cerium oxide loaded with Pt, and a catalyst powder of Comparative Example No. 10 was prepared.

(Evaluation of Catalysts)

As an evaluation gas, a gas was used which contained formaldehyde as one of the odorants: 100 ppb, oxygen: 20% and the balance of nitrogen. 0.5 g of each of the aforementioned catalyst samples and the evaluation gas were put in a 5-liter gas container (made by Ohmi Odor Air Service Co., Ltd.) for an odor analysis. Then, the evaluation gas was circulated at room temperature by using a circulating pump at a circulating rate of 10 liter/minute. In this instance, the space velocity was 600,000 $hr^{-1}$. In the aforementioned measurements, a filter was placed in front of the gas pump so that the samples did not dissipate from the gas containers. The conversions of formaldehyde were measured after the gas was circulated after 20 minutes. In the measurements, the formaldehyde concentrations were analyzed by using a formaldehyde analyzer, which was based on the enzyme-chemical emission method. The formaldehyde concentrations were determined by the following equation.

Formaldehyde Concentration (%)=[{(Formaldehyde Concentration in Gas Container before Reaction)−(Formaldehyde Concentration after 20 minutes from Coexisting of Sample)}/Formaldehyde Concentration in Gas Container before Reaction)]×100

The results are set forth in Table 2.

TABLE 2

| | Ce:O Ratio | | Loading Amount (g, To 150 g of Cerium Oxide) | | | | | Formaldehyde Conversion |
|---|---|---|---|---|---|---|---|---|
| | Ce | O | Pt | Pd | Rh | Au | Ru | (%) |
| E. # 9 | 1 | 1.9 | 1 | — | — | — | — | 56 |
| E. # 10 | 1 | 1.8 | 1 | — | — | — | — | 57 |
| E. # 11 | 1 | 1.7 | 1 | — | — | — | — | 60 |
| E. # 12 | 1 | 1.65 | 1 | — | — | — | — | 68 |
| E. # 13 | 1 | 1.6 | 1 | — | — | — | — | 73 |
| E. # 14 | 1 | 1.55 | 1 | — | — | — | — | 79 |
| E. # 15 | 1 | 1.5 | 1 | — | — | — | — | 88 |
| E. # 16 | 1 | 1.8 | 0.1 | — | — | — | — | 52 |
| E. # 17 | 1 | 1.8 | 0.5 | — | — | — | — | 56 |
| E. # 18 | 1 | 1.8 | 5 | — | — | — | — | 64 |
| E. # 19 | 1 | 1.8 | 15 | — | — | — | — | 62 |
| E. # 20 | 1 | 1.8 | 17 | — | — | — | — | 60 |
| E. # 21 | 1 | 1.8 | 0.01 | — | — | — | — | 50 |
| E. # 22 | 1 | 1.8 | — | 1 | — | — | — | 56 |
| E. # 23 | 1 | 1.8 | — | — | 1 | — | — | 57 |
| E. # 24 | 1 | 1.8 | — | — | — | 1 | — | 55 |
| E. # 25 | 1 | 1.8 | — | — | — | — | 1 | 55 |
| E. # 26 | 1 | 1.8 | 1 | i | — | — | — | 62 |
| C. E. # 9 | 1 | 2.0 | 1 | — | — | — | — | 40 |
| C. E. # 10 | Activated Carbon | — | — | — | — | — | — | 38 |

As set forth in Table 2, the catalysts of Example Nos. 9 through 15 exhibited higher conversions than that of Comparative Example No. 9, which was loaded with the same amount of noble metal, but which was not subjected to the reduction treatment, and that of the activated carbon of Comparative Example No. 10. Thus, it is shown that the catalysts of Example No. 9 through 15 were effective in the purification at an ordinary temperature. In particular, it is shown that Example No. 15 exhibited a high conversion of 88%, and that the conversion was higher in the case that the oxygen defect rate was high than in the case that the loading amount of noble metal was large. Therefore, it is suggested that a larger oxygen defect of the oxide is more effective in enhancing the purifying performance.

Example No. 16 through Example No. 21 set forth that there are an optimum Pt loading amount. It is preferred that the amount of noble metal loaded and used on the cerium oxide is in a range of from 0.01 to 20 g with respect to 150 g of the cerium oxide, further preferably, in a range of from 0.5 to 5 g with respect thereto. When Pt is thus included, the harmful materials can be purified at room temperature. Example No. 22 through Example No. 26 show that the noble metals other than Pt are also effective.

EXAMPLE NO. 27

A dinitro diammine platinum aqueous solution was added to an iron oxide powder so that the platinum was 2 g with respect to 200 g of the iron oxide, was dried, and was evaporated to dry, thereby obtaining an iron oxide powder loaded with platinum salt. This powder was burned at 500° C. in air for 3 hours, thereby obtaining an iron oxide catalyst loaded with platinum. Before carrying out a measurement on an oxidation activity of this catalyst to carbon monoxide at an ordinary temperature, this catalyst was subjected to an activation treatment, in which it was reduced at 300° C. in a nitrogen flow containing CO in an amount of 1% for 15 minutes, so that an oxygen defect was introduced into the catalyst,

EXAMPLE NO. 28

Except that a manganese oxide powder was used instead of the iron oxide powder, a manganese oxide catalyst loaded with platinum was prepared in the same manner as Example No. 27.

Comparative Example No. 11

Except that silica was used instead of the iron oxide powder, a silica catalyst loaded with platinum was prepared in the same manner as Example No. 27.

Comparative Example No. 12

Except that zirconia was used instead of the iron oxide powder, a zirconia catalyst loaded with platinum was prepared in the same manner as Example No. 27.

Comparative Example No. 13

Except that alumina was used instead of the iron oxide powder, an alumina catalyst loaded with platinum was prepared in the same manner as Example No. 27.

An evaluation on each of the catalysts prepared as aforementioned (Example Nos. 27 through 28 and Comparative Example Nos. 11 through 13) was carried out under the following conditions: namely; 20 g of each of the catalysts was exposed to a gas, whose CO concentration was 250 ppm and oxygen concentration was 20%, and which flowed at a rate of 5 L/min. The results are set forth in Table 3.

TABLE 3

| CO Conversion at 30 minutes after Starting Reaction | |
|---|---|
| Example No. 27 | 54% |
| Example No. 28 | 99% |
| Comp. Ex. No. 11 | 25% |
| Comp. Ex. No. 12 | 15% |
| Comp. Ex. No. 13 | 15% |

Figure 7:
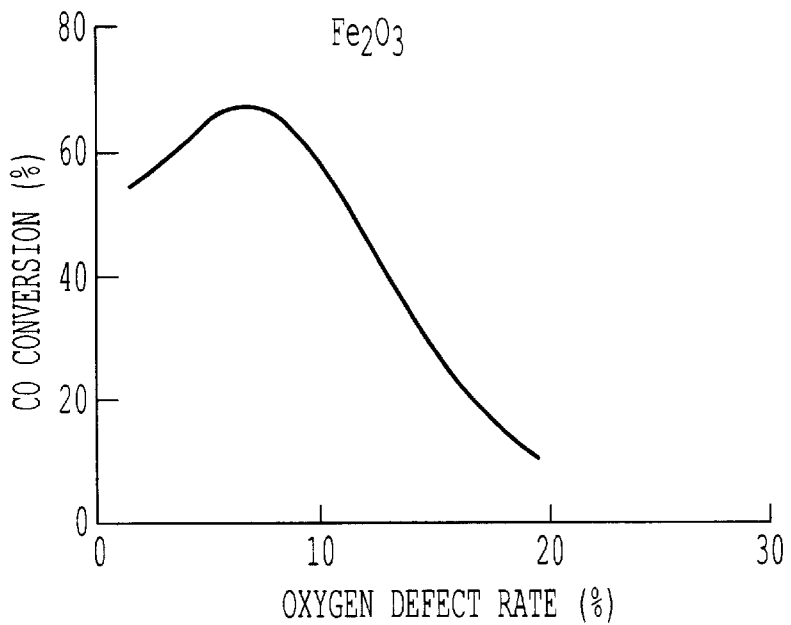
FIG. 7 is a graph for illustrating the relationship between the oxygen defect rate of the iron oxide and the CO conversion, relationship which was exhibited by Example No. 27.
Figure 8:
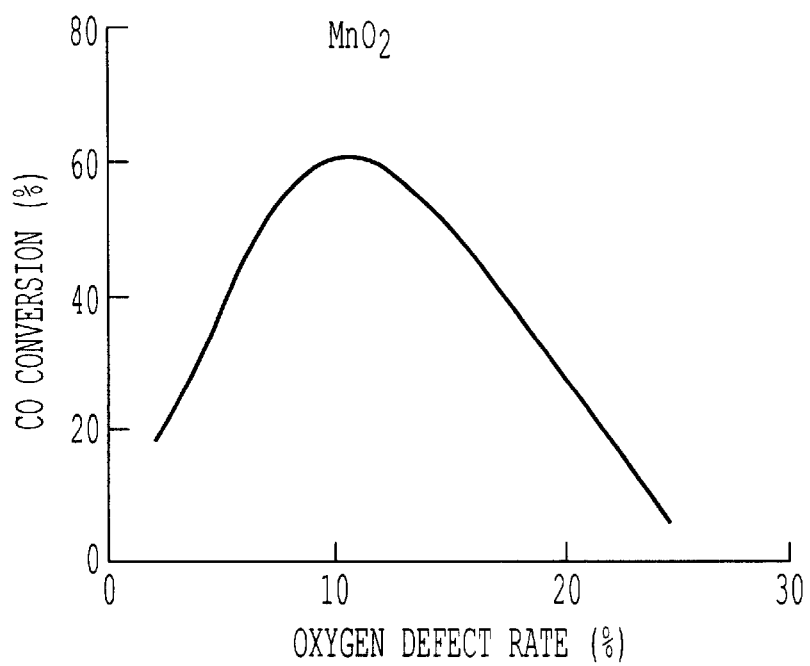
FIGS. 8 is a graph for illustrating the relationship between the oxygen defect rate of the manganese oxide and the CO conversion, relationship which was exhibited by Example No. 28.

FIG. 7 and FIG. 8 illustrate the relationships between the oxygen defect rates and the CO conversions in the iron oxide catalyst of Example No. 27 and in the manganese oxide catalyst of Example No. 28, respectively. Example No. 27 was examined for the catalytic activity under the following conditions: namely; 20 g of the catalyst was exposed to a gas flowing at a rate of 5 L/min. Example No. 28 was examined for the catalytic activity under the following conditions: namely; 5 g of the catalyst was exposed to a gas flowing at a rate of 10 L/min. Note that the condition of the gas composition: namely; 250 ppm of CO and 20% of $O_2$ was common in both of the measurements. Both of them were appreciated to exhibit a peak of CO conversion at around 10% of oxygen defect rate, however, they showed that CO could be purified when the oxygen defect exists therein. According to FIG. 7, in the case of the iron oxide catalyst, it is understood that the oxygen defect rate preferably falls in a range of from 2 to 11%. According to FIG. 8, in the case of the manganese oxide, it is understood that the oxygen defect rate preferably falls in a range of from 5 to 18%. Here, the oxygen defect rate of the iron oxide, or the oxygen defect rate of the manganese oxide specifies a ratio of a deficient amount of oxygen with respect to oxygen amount contained in $Fe_2O_3$ or $MnO_2$.

As set forth in Table 3, it is shown that the catalyst of the present invention exhibits a purifying performance at an ordinary temperature.

EXAMPLE NO. 29

A zirconium nitrate aqueous solution was mixed with cerium oxide so that a slurry was prepared in which Ce/Zr= 10/1 by molar ratio. This slurry was dried at 130° C. for 3 hours, and was thereafter burned at 500° C. in air for 3 hours. Pt was loaded in a ratio of 2 g with respect to 150 g of the thus obtained $CeO_2.ZrO_2$ powder. This powder was pelletized to have a diameter of from 1 to 2 mm. Thereafter, the powder was subjected to a reduction treatment in an $N_2$ gas, containing hydrogen in an amount of 5%, at 500° C. for 1 hour. The thus prepared powder was regarded as a catalyst sample of Example No. 29.

1 g of this catalyst sample was evaluated on a purifying performance with respect to an ethylene gas.

The evaluation gas contained 20% of oxygen, including ethylene (initial concentration: 200 ppm), and the balance of nitrogen, and was flowed in an amount of 5 L.

The evaluation method was as follows. The sample and the evaluation gas were put in a gas container (made by Ohmi Odor Air Service Co., Ltd.) for an odor analysis. The container was stood still in a constant temperature bath being kept at 10° C. The ethylene concentrations after 1 hour, after 2 hours, after 3 hours and after 24 hours were measured by an "FID" type gas chromatograph (HCM-1B made by Shimazu Co., Ltd.), thereby obtaining a chronological variation of the ethylene concentration. The results are illustrated in FIG. 9.

As a comparative example, the following cases were similarly evaluated where the catalyst of the present invention was not used (Comparative Example No. 14), and where an activated carbon powder (BFG3 made by Cataler Co., Ltd.) was used in the same amount and by the same ratio as those of Example No. 24 (Comparative Example No. 15).

Figure 9:
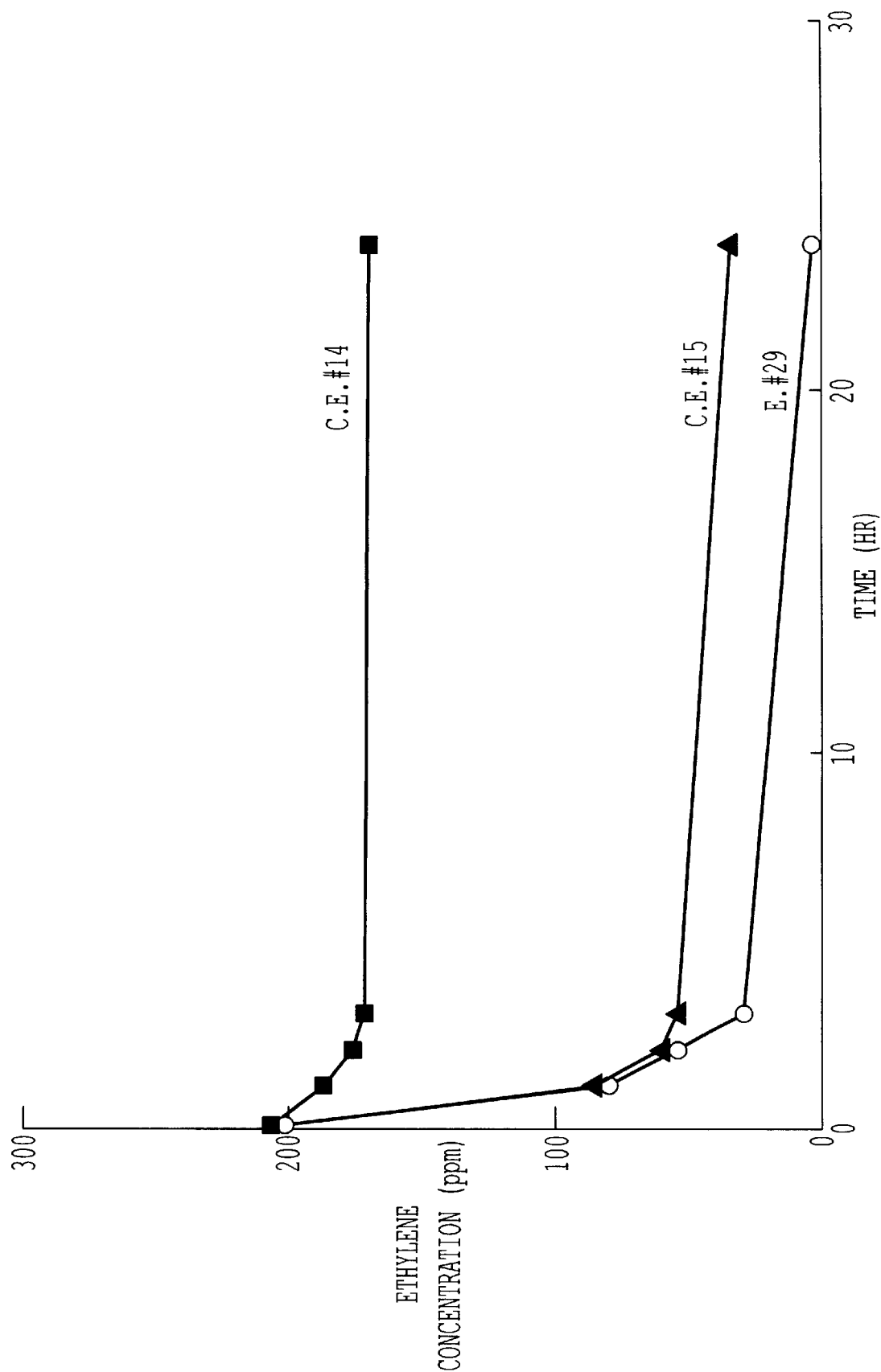
FIG. 9 is a graph for examining the chronological variations of ethylene concentration which were exhibited by the ordinary-temperature purifying catalyst of Example No. 29, Comparative Example No. 14 free from the ordinary-temperature purifying catalyst and Comparative Example No. 15 employing activated carbon.

As illustrated in FIG. 9, it is apparent that Example No. 29 was higher than the activated carbon of Comparative Example No. 15 in terms of the ethylene removing ability.

EXAMPLE NO. 30

Broccoli, whose qualities are likely to deteriorate, for instance, which yellows or whose buds bloom on the way of circulation, was selected as one of perishables. The yellowing degree of the buds was examined for how to maintain the freshness. Note that the yellowing degree was visually inspected by an organoleptic test based on the following standard: namely; "Yellowing Degree"=0 meant that no yellowing occurred; "Yellowing Degree"=1 meant that yellowing occurred slightly; "Yellowing Degree"=2 meant that yellowing occurred considerably; and "Yellowing Degree"=3 meant that all the buds yellowed.

A bunch of commercially available broccoli (breed name: Tohrei) was put in a I-liter sampling bag (made by GL Science Co., Ltd., material: fluororesin and film thickness: 50 μm) for an odor analysis. Further, the catalyst used in Example No. 29 was also put in the bag in an amount of 1 g with respect to 1 kg of the broccoli, and the sampling bag was sealed. Then, air was carefully introduced into the sampling bag in an amount of 1 liter by an air bomb, which had been prepared in advance, in order that the catalyst in the sampling bag did not scatter.

Subsequently, this sampling bag was put in a constant temperature bath being kept at 10° C. The yellowing degree of the broccoli in the sampling bag was observed regularly, and was evaluated chronologically.

As a comparative example, the following cases were similarly evaluated where the catalyst of the present invention was not used (Comparative Example No. 16), and where an activated carbon powder (BFG3 made by Cataler Co., Ltd. )was used in the same amount and by the same ratio as those of Example No. 30 (Comparative Example No. 17).

The results are set forth in Table 4.

TABLE 4

| | Yellowing Degree (0–3) | | |
|---|---|---|---|
| | Ex. No. 30 | Comp. Ex. No. 16 | Comp. Ex. No. 17 |
| Before Starting | 0 | 0 | 0 |
| 1 Day Passed | 0 | 0 | 0 |
| 2 Days Passed | 0 | 1 | 0 |
| 3 Days Passed | 0 | 1 | 1 |
| 4 Days Passed | 0 | 2 | 1 |
| 5 Days Passed | 1 | 2 | 2 |

As set forth in Table 4, it is apparent that the yellowing degree of the buds developed slower in Example No. 30 than Comparative Example Nos. 16 and 17, and that Example No. 30 was effective in keeping the broccoli fresh.

EXAMPLE NO. 31

An apple was selected as one of perishables. The freshness keeping effect exhibited by the catalyst of the present invention was evaluated in terms of the discoloring of the pericarp, the hardness of the fruit and the taste index.

Two commercially available apples (breed name: Fuji) were put in a 1-liter sampling bag (made from aluminum, a film thickness of 130 μm and made by GL Science Co., Ltd.) for an odor analysis. Further, the catalyst of Example No. 29 was also put in the bag in an amount of 0.5 g with respect to 1 kg of the apples.

Subsequently, this sampling bag was put in a constant temperature bath being kept at 15° C. The apples in the sampling bag were evaluated in terms of the discoloration of the pericarp, the hardness of the fruit and the taste index were evaluated regularly.

As a comparative example, the following cases were similarly evaluated where the catalyst of Example No. 31 was not used (Comparative Example No. 18), and where an activated carbon powder (BFG-3 made by Cataler Co., Ltd.) was used in the same amount and by the same ratio as those of Example No. 31 (Comparative Example No. 19).

The hardness of the fruit was carried out by a three-level evaluation in the following manner: namely; "1" meant hard; "2" meant slightly softened; and "3" meant "softened.

The taste index was carried out by a 5-level evaluation in the following manner: namely; "0" meant always bad; "0.5" meant bad; "1" meant slightly bad; "1.5" meant good; and "2" meant very good.

TABLE 5

In the case where the catalyst of Example No. 31 was used

| | Discoloration of Pericarp | Hardness | Taste Index |
|---|---|---|---|
| Immediately after Purchase | | 1 | 2.0 |
| 7 Days Passed | None | 1 | 2.0 |
| 14 Days Passed | None | 1.25 | 1.75 |

TABLE 6

In the case where no catalyst was used

| | Discoloration of Pericarp | Hardness | Taste Index |
|---|---|---|---|
| Immediately after Purchase | | 1 | 2.0 |
| 7 Days Passed | Slightly Yellowed | 1.5 | 1.5 |
| 14 Days Passed | Many Yellowed Spots | 2.0 | 0.75 |

TABLE 7

In the case where the catalyst of Comp. Ex. No. 19 was used

| | Discoloration of Pericarp | Hardness | Taste Index |
|---|---|---|---|
| Immediately after Purchase | | 1 | 2.0 |

TABLE 7-continued

In the case where the catalyst of Comp. Ex. No. 19 was used

|  | Discoloration of Pericarp | Hardness | Taste Index |
|---|---|---|---|
| 7 Days Passed | None | 1.25 | 1.5 |
| 14 Days Passed | Slightly Yellowed | 1.5 | 1 |

As set forth in Table 5 through Table 7, in Comparative Example Nos. 18 and 19, the hardness and the taste index decreased remarkably. on the other hand, in Example No. 31, the apples were substantially kept in a state immediately after they were purchased. Consequently, Example No. 31 was found to be effective in keeping the apples fresh.

Hence, the ordinary-temperature purifying catalyst of Example No. 31 showed that it had an ability to remove ethylene at an ordinary temperature.

EXAMPLE NO. 32

Deionized water was prepared in an amount which was equivalent to an amount of water absorption exhibited by 75 g of activated carbon graded to a particle diameter of from 0.5 to 2 mm. Into the deionized water, cerium nitrate hexa-hydrate (equivalent to 75 g by $CeO_2$ conversion) and $Pt(NO_2)_2(NH_3)_2$ (equivalent to 0.5 g by Pt conversion) were solved. Thereafter, the aqueous solution was absorbed in 75 g of activated carbon. The resulting activated carbon, a catalyst precursor, was dried in air at 110° C. for 6 hours Then, in a nitrogen gas atmosphere containing hydrogen in an amount of 5%, the activated carbon was heated to 500° C. at a temperature increment rate of 5° C./min or less, and was thereafter held as it was for 1 hour. Thereafter, the activated carbon was cooled to room temperature, thereby obtaining a catalyst of Example No. 32.

EXAMPLE NO. 33

Deionized water was prepared in an amount which was equivalent to an amount of water absorption exhibited by 75 g of activated carbon graded to a particle diameter of from 0.5 to 2 mm. Into the deionized water, cerium nitrate hexa-hydrate (equivalent to 75 g by $CeO_2$ conversion) was solved. Thereafter, the aqueous solution was absorbed in 75 g of activated carbon. The resulting activated carbon, a catalyst precursor, was dried in air at 110° C. for 6 hours. Then, in a nitrogen gas atmosphere containing hydrogen in an amount of 5%, the activated carbon was heated to 500° C. at a temperature increment rate of 5° C./min or less, and was thereafter held as it was for 1 hour. Subsequently, by using an aqueous solution which contained $Pt(NO_2)_2(NH_3)_2$ (equivalent to 0.5 g by Pt conversion), Pt was loaded on the activated carbon. Then, in a nitrogen gas atmosphere containing hydrogen in an amount of 5%, the activated carbon was heated to 500° C. at a temperature increment rate of 5° C./min or less, and was thereafter held as it was for 1 hour. Thereafter, the activated carbon was cooled to room temperature, thereby obtaining a $Pt/CeO_2$/activated carbon catalyst of Example No. 33.

EXAMPLE NO. 34

Cerium nitrate hexa-hydrate (equivalent to 60 g by $CeO_2$ conversion) and 75 g of powder-shaped activated carbon were added to 500 g of deionized water, and were fully stirred. Thereafter, an ammonia aqueous solution was added in an amount of 1.2 times of the neutralization equivalent, thereby obtaining activated carbon, a catalyst precursor. Then, in a nitrogen atmosphere, the catalyst precursor was heated to 500° C. at a temperature increment rate of 5° C./min or less, and was thereafter heated as it was for 3 hours. Thereafter, Pt was loaded on the product by using an aqueous solution which contained $Pt(NO_2)_2(NH_3)_2$ (equivalent to 0.5 g by Pt conversion). Then, in a nitrogen gas atmosphere containing hydrogen in an amount of 5%, the catalyst precursor was heated to 500° C. at a temperature increment rate of 5° C./min or less, and was thereafter held as it was for 1 hours After the resulting catalyst was cooled to room temperature, the catalyst precursor loaded with Pt was mixed and kneaded with a ceria sol (equivalent to 15 g by $CeO_2$ conversion) and 68 g of deionized water, and was thereafter granulated to a particle diameter of from 0.5 to 2 mm. The resulting pellets were dried in air at 110° C. for 6 hours. Then, in a nitrogen gas atmosphere containing hydrogen in an amount of 5%, the pellets were heated at 500° C. for 1 hour, and were thereafter cooled to room temperature, thereby preparing a catalyst of Example No. 34.

EXAMPLE NO. 35

Except that a catalyst precursor was prepared in the following manner, a catalyst of Example No. 35 was prepared in the same manner as Example No. 34. Namely, cerium nitrate hexa-hydrate (equivalent to 60 g by $CeO_2$ conversion), zirconium oxynitrate di-hydrate (equivalent to 9 g by $ZrO_2$ conversion) and 75 g of powder-shaped activated carbon were added to 500 g of deionized water, and were fully stirred. Thereafter, an ammonia aqueous solution was added in an amount of 1.2 times of the neutralization equivalent, thereby obtaining a catalyst precursor.

EXAMPLE NO. 36

Cerium nitrate hexa-hydrate (equivalent to 60 g by $CeO_2$ conversion), and 75 g of powder-shaped activated carbon, and further $Pt(NO_2)_2(NH_3)_2$ (equivalent to 0.5 g. by Pt conversion) were added to 500 g of deionized water, and were fully stirred. Thereafter, an ammonia aqueous solution was added in an amount of 1.2. times of the neutralization equivalent, thereby obtaining a catalyst precursor. Then, in a nitrogen gas atmosphere containing hydrogen in an amount of 5%, the catalyst precursor was heated to 500° C. at a temperature increment rate of 5° C./min or less, and was thereafter heated for 3 hours as it was. Subsequently, the resulting powder was mixed and kneaded with a ceria sol (equivalent to 15 g by $CeO_2$ conversion) and 68 g of deionized water, and were thereafter granulated to a particle diameter of from 0.5 to 2 mm. The resulting pellets were dried in air at 110° C. for 6 hours. Then, in a nitrogen gas atmosphere containing hydrogen in an amount of 5%, the pellets were further heated at 500° C. for 1 hour, and were thereafter cooled to room temperature, thereby preparing a catalyst of Example No. 36.

EXAMPLE NO. 37

Powder-shaped activated carbon, Pt (0.5 g)/$CeO_2$ (60 g) which was prepared by loading 0.5 g of Pt on 60 g of $CeO_2$ and by burning them in air at 500° C. for 1 hour, a ceria sol (equivalent to 15 g by $CeO_2$ conversion) which worked as a binder, and 68 g of deionized water were compounded and kneaded. Thereafter, the resulting mixture was dried in air at 110° C. for 6 hours. Subsequently, in a nitrogen atmosphere containing hydrogen in an amount of 5%, the mixture was heated at 500° C. for 1 hour, and was cooled to room temperature, thereby preparing a catalyst of Example No. 37.

Comparative Example No. 20

Activated carbon, which was free from the loading of both of Pt and $CeO_2$, was taken as a catalyst of Comparative Example No. 20.

Comparative Example No. 21

Except that $Pt(NO_2)_2$ $(NH_3)_2$ (equivalent to 0.25 g by Pt conversion) was solved in an amount of deionized water, amount which was equivalent to an amount of water absorption exhibited by 75 g of activated carbon, a Pt/activated carbon catalyst of Comparative Example No. 21 was prepared in the same manner as Example No. 32.

Comparative Example No. 22

Pt (0.5 g) /activated carbon (75 g) which was prepared by using powder-shaped activated carbon by loading 0.5 g of Pt on 75 g of the activated carbon in the same manner as Comparative Example No. 21, 60 g of a $CeO_2$ powder, a ceria sol (equivalent to 15 g by $CeO_2$ conversion), and 68 g of deionized water were compounded and kneaded, and were thereafter granulated to a particle diameter of from 0.5 to 2 mm. Further, in a nitrogen gas atmosphere containing hydrogen in an amount of 5%, the resulting pellets were heated at 500° C. for 1 hour, and were thereafter cooled to room temperature, thereby preparing a catalyst of Comparative Example No. 22. Note that, in the catalyst of Comparative Example No. 22, most of Pt was loaded on the activated carbon.

EVALUATION

Figure 10:
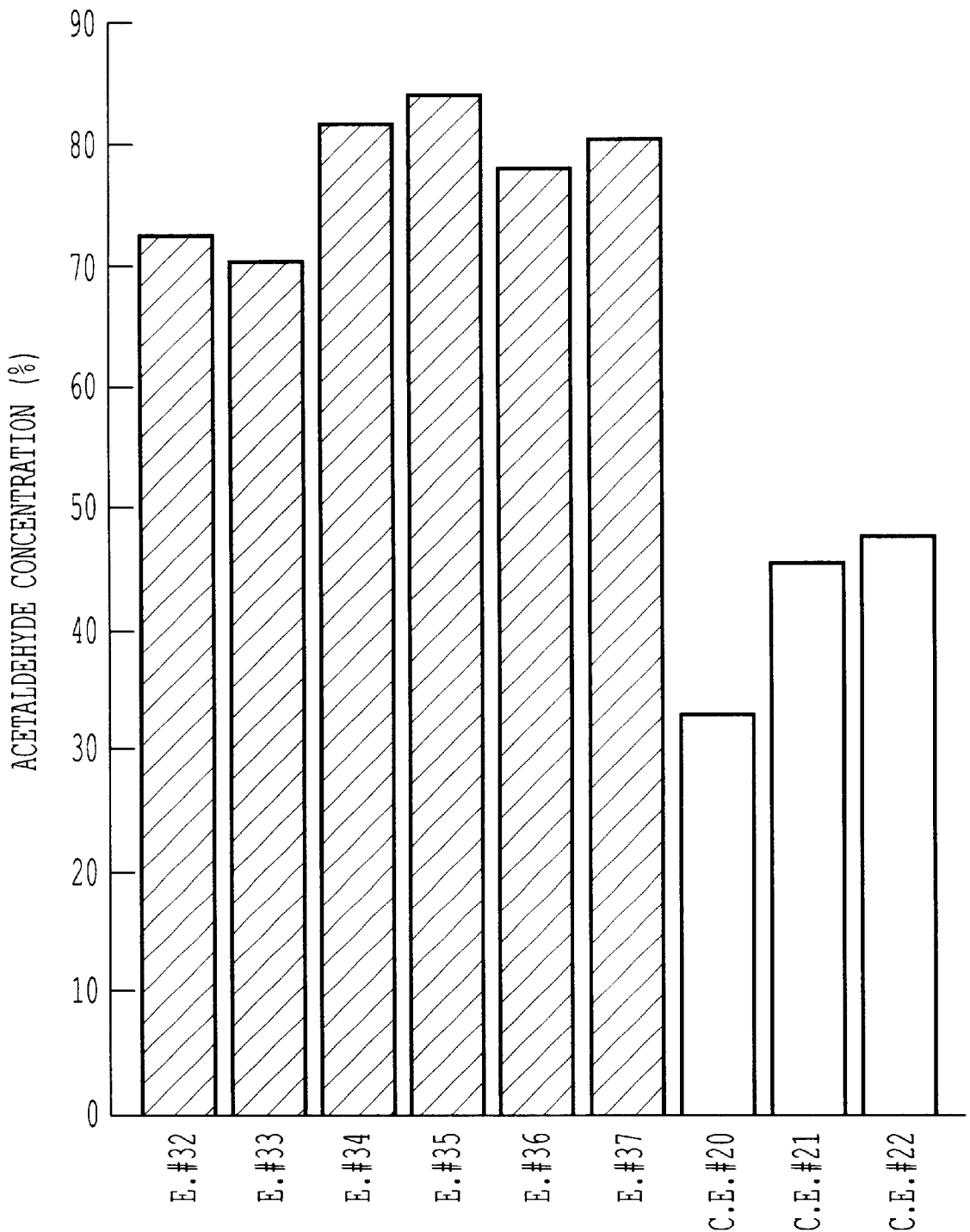
FIG. 10 is a bar graph for illustrating the conversions of acetaldehyde which were exhibited by Example Nos. 32 through 37 and Comparative Example Nos. 20 through 22.
Figure 11:
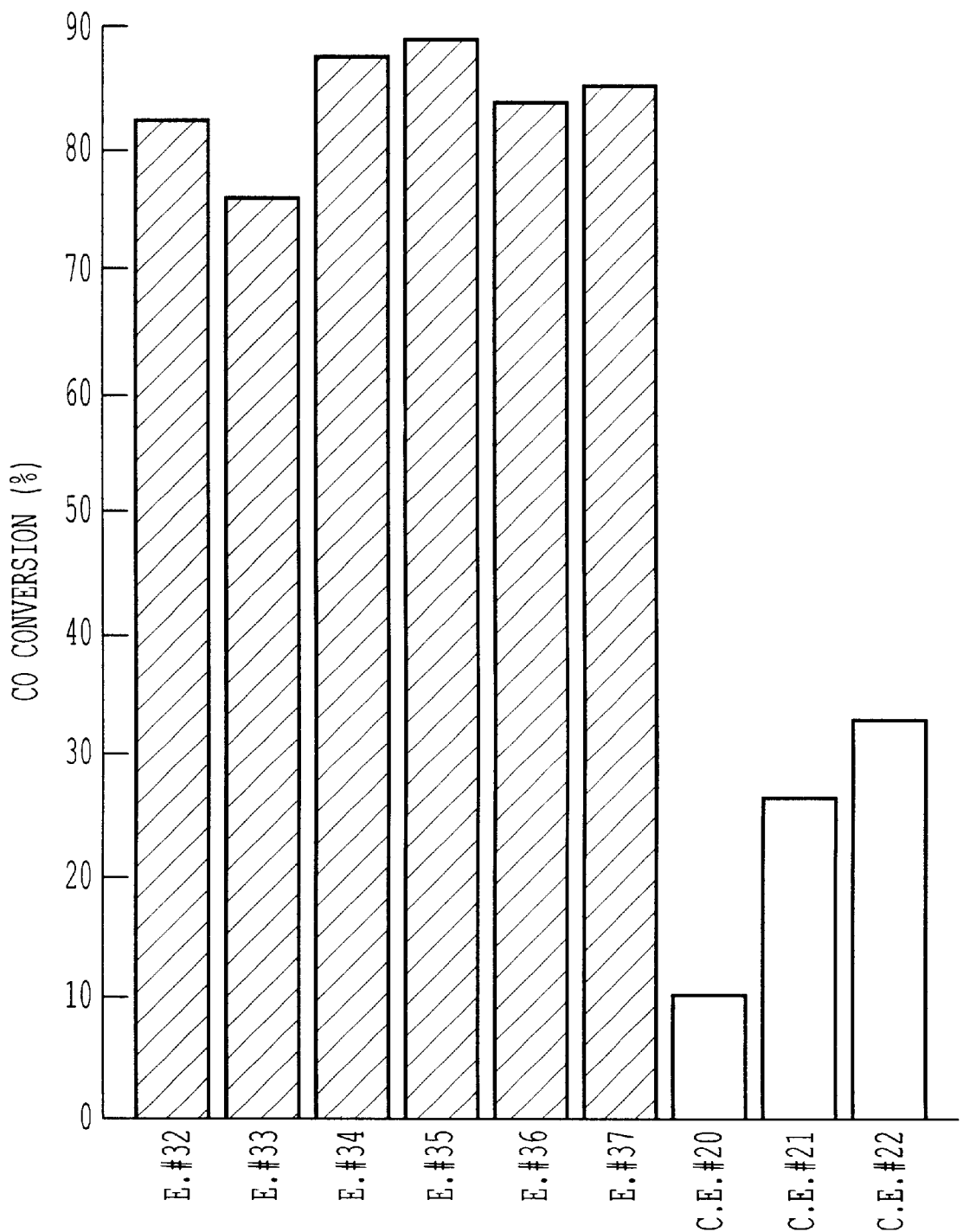
FIG. 11 is a bar graph for illustrating the conversions of carbon monoxide which were exhibited by Example Nos. 32 through 37 and Comparative Example Nos. 20 through 22.

FIG. 10 illustrates the acetaldehyde conversions which were exhibited by the catalysts described above. FIG. 11 illustrates the CO conversions which were exhibited by the catalysts.

The odorant removing test was carried out in the following manner, and was a one-pass test. Namely, acetaldehyde was employed as a representative example of odorants; the catalysts were used in an amount of 2 g; the evaluation gas was composed of acetaldehyde in an amount of 20 ppm, oxygen in an amount of 20% and the balance of a nitrogen gas; the evaluation gas was flowed at a flow rate of 5 liter/min; the reaction was carried out at room temperature; and the acetaldehyde conversions at 1 hour after the evaluation gas was started flowing were regarded as the acetaldehyde conversions and were examined.

The CO purifying test was carried out in the following manner, and was a one-pass test. Namely, the catalysts were used in an amount of 2 g; the evaluation gas was composed of CO in an mount of 250 ppm, oxygen in an amount of 20% and the balance of a nitrogen gas; the evaluation gas was flowed at a flow rate of 10 liter/min; the reaction was carried out at room temperature; and the Co conversions at 1 hour after the evaluation gas was stared flowing were regarded as the CO conversions and were examined.

Comparative Example No. 20, in which only the activated carbon was used, exhibited a low acetaldehyde conversion of about 30%. Comparative Example No. 21, in which Pt was loaded on the activated carbon, exhibited an acetaldehyde conversion of less than 50%. Comparative Example No. 22, in which the Pt-loaded activated carbon and $CeO_2$ were blended, exhibited an acetaldehyde purifying activity which was substantially identical with that of Comparative Example No. 21.

On the other hand, Example No. 37, in which the Pt-loaded $CeO_2$ and the activated carbon were blended, exhibited an acetaldehyde conversion of about 80%. Thus, it is indicated that it is necessary to load Pt on CeO a. In the other examples as well, since Pt was loaded on $CeO_2$, it is believed that they exhibited higher purifying performances than comparative examples. As set forth in Example No. 32 and 33, the way how to load Pt and $CeO_2$ on activated carbon can be such that $CeO_2$ and then Pt can be loaded successively on activated carbon, or that the both of them can be loaded simultaneously thereon. This is also the case in Example No. 34 and Example No. 36.

Further, according to the comparison between Example No. 35 and Example No. 34, it is understood that the purifying performance was higher in the case where $CeO_2$ and $ZrO_2$ were included as support components in addition to activated carbon than in the case where only $CeO_2$ was included.

Having now fully described the present invention, it will be apparent to one of ordinary skill in the art that many changes and modifications can be made thereto without departing from the spirit or scope of the present invention as set forth herein including the appended claims.

What is claimed is:

1. An ordinary-temperature purifying catalyst, comprising:

an oxide having an oxygen defect introduced by a reduction treatment; and a noble metal loaded on the oxide, wherein said oxide includes (1) an iron oxide, at least a part of the iron oxide having a ratio of a deficient amount of oxygen falling in a range of from 2 to 11% with respect to an oxygen amount contained in $Fe_2O_3$, or (2) a manganese oxide, at least a part of the manganese oxide having a ratio of a deficient amount of oxygen falling in a range of from 5 to 18% with respect to an oxygen amount contained in $MnO_2$.

2. The ordinary-temperature purifying catalyst according to claim 1 being capable of purifying an environmental loading material in air at an ordinary temperature.

3. The ordinary-temperature purifying catalyst according to claim 2, wherein the environmental loading material is an odorant.

4. The ordinary-temperature purifying catalyst according to claim 3, having a conversion ratio of 50% or more at 20 minutes after the initiation of a purifying reaction provided that said odorant is supplied at 25° C. at a space velocity of 120,000 $hr^{-1}$.

5. The ordinary-temperature purifying catalyst according to claim 2, wherein the environmental loading material is carbon monoxide.

6. The ordinary-temperature purifying catalyst according to claim 5, having a conversion ratio of 40% or more at 30 minutes after the initiation of a purifying reaction provided that said carbon monoxide is supplied 25° C. at a space velocity of 120,000 $hr^{-1}$.

7. The ordinary-temperature purifying catalyst according to claim 2, wherein the environmental loading material is a nitrogen oxide.

8. The ordinary temperature purifying catalyst according to claim 2, wherein the environmental loading material is ethylene.

9. The ordinary-temperature purifying catalyst according to claim 1 loaded on at least one support selected from the group consisting of titanium oxide, alumina, silica, zeolite, cordierite, sepiolite and activated carbon.

10. The ordinary-temperature purifying catalyst according to claim 1 being capable of purifying at least one environmental loading material selected from the group consisting of formaldehyde, trimethylamine, methyl mercaptan, and acetaldehyde.

11. The ordinary-temperature purifying catalyst according to claim 1, wherein said oxide has a specific surface area of 50 m$^2$/g or more by being subjected to a reduction treatment at 500° C. for 1 hour.

12. The ordinary-temperature purifying catalyst according to claim 1, wherein said oxide has a specific surface area of 15 m$^2$/g or more by being subjected to a reduction treatment at 800° C. for 1 hour.

13. The ordinary-temperature purifying catalyst according to claim 1, wherein said noble metal has a particle diameter of 5 nm or less.

14. The ordinary-temperature purifying catalyst according to claim 13, wherein said noble metal has a particle diameter of 1 nm or less.

15. The ordinary-temperature purifying catalyst according to claim 1, wherein said reduction treatment is carried out at a temperature range of from 100 to 800° C.

16. The ordinary-temperature purifying catalyst according to claim 15, wherein said reduction treatment is carried out at a temperature range of from 200 to 600° C.

17. The ordinary-temperature purifying catalyst according to claim 1, wherein said ordinary temperature is a temperature range selected not to preclude the oxygen defect from the oxide.

18. The ordinary-temperature purifying catalyst according to claim 1,
wherein said oxide includes an iron oxide, at least a part of the iron oxide having a ratio of a deficient amount of oxygen falling in a range of from 2 to 11% with respect to an oxygen amount contained in $Fe_2O_3$.

19. The ordinary-temperature purifying catalyst according to claim 1,
wherein said oxide includes a manganese oxide, at least a part of the manganese oxide having a ratio of a deficient amount of oxygen falling a range of from 5 to 18% with respect to an oxygen amount contained in $MnO_2$.

20. A method for using an ordinary-temperature purifying catalyst, comprising a step of contacting the ordinary-temperature purifying catalyst with air including at least one environmental loading material selected from the group consisting of carbon monoxide, a nitrogen oxide, ethylene, aldehyde, amine, mercaptan, fatty acids, aromatic hydrocarbon, and odorants; and purifying the environmental loading material at an ordinary temperature,
wherein said catalyst comprises:
an oxide having an oxygen defect introduced by a reduction treatment; and
a noble metal loaded on the oxide, and
wherein said oxide includes (1) a cerium oxide being represented by a formula of $CeO_n$ wherein $1.5 \leq n < 2$ after said reduction treatment; or (2) an iron oxide, at least a part of the iron oxide having a ratio of a deficient amount of oxygen falling in a range of from 2 to 11% with respect to an oxygen amount contained in $Fe_2O_3$; or (3) a manganese oxide, at least a part of the manganese oxide having a ratio of the deficient amount of oxygen falling in a range of from 5 to 18% with respect to an oxygen amount contained in $MnO_2$.

21. The method according to claim 20, wherein the environmental loading material is selected from the group consisting of aldehydes, amines, mercaptans, fatty acids, aromatic hydrocarbons, and odorants.

22. The method according to claim 20, wherein the environmental loading material is selected from the group consisting of formaldehyde, acetaldehyde, methyl mercaptan, and trimethylamine.

23. The method according to claim 20, wherein the environmental loading material is formaldehyde.

24. The method according to claim 20, wherein the environmental loading material is an odorant.

25. The method for using an ordinary-temperature purifying catalyst according to claim 20,
wherein said oxide includes a cerium oxide being represented by a formula of $CeO_n$ wherein $1.5 \leq n < 2$ after said reduction treatment.

26. The method for using an ordinary-temperature purifying catalyst according to claim 20,
wherein said oxide includes an iron oxide, at least a part of the iron oxide having a ratio of a deficient amount of oxygen falling in range of from 2 to 11% with respect to an oxygen amount contained in $Fe_2O_3$.

27. The method for using an ordinary-temperature purifying catalyst according to claim 20,
wherein said oxide includes a manganese oxide, at least a part of the manganese oxide having a ratio of a deficient amount of oxygen falling in a range of from 5 to 18% with respect to an oxygen amount contained in $MnO_2$.

* * * * *